US011260530B2

(12) United States Patent
Sankai

(10) Patent No.: US 11,260,530 B2
(45) Date of Patent: Mar. 1, 2022

(54) UPPER LIMB MOTION SUPPORT APPARATUS AND UPPER LIMB MOTION SUPPORT SYSTEM

(71) Applicants: CYBERDYNE INC., Tsukuba (JP); UNIVERSITY OF TSUKUBA, Tsukuba (JP)

(72) Inventor: Yoshiyuki Sankai, Ibaraki (JP)

(73) Assignees: CYBERDYNE INC., Tsukuba (JP); UNIVERSITY OF TSUKUBA, Tsukuba (JP)

(*) Notice: Subject to any disclaimer, the term of this patent is extended or adjusted under 35 U.S.C. 154(b) by 136 days.

(21) Appl. No.: 16/465,876

(22) PCT Filed: Apr. 7, 2017

(86) PCT No.: PCT/JP2017/014594
§ 371 (c)(1),
(2) Date: May 31, 2019

(87) PCT Pub. No.: WO2018/100760
PCT Pub. Date: Jun. 7, 2018

(65) Prior Publication Data
US 2020/0346347 A1    Nov. 5, 2020

(30) Foreign Application Priority Data

Dec. 2, 2016  (JP) .............................. JP2016-235458

(51) Int. Cl.
*B25J 9/06*   (2006.01)
*B25J 9/16*   (2006.01)
(Continued)

(52) U.S. Cl.
CPC .......... *B25J 9/1666* (2013.01); *A61H 1/0274* (2013.01); *B25J 9/06* (2013.01);
(Continued)

(58) Field of Classification Search
CPC . B25J 9/1666; B25J 9/1697; B25J 9/06; B25J 9/1633; B25J 9/0006; B25J 13/087;
(Continued)

(56) References Cited

U.S. PATENT DOCUMENTS 7,367,958 B2 * 5/2008 McBean ................ A61B 5/389
602/16
9,868,012 B2 * 1/2018 Burdea .............. A63B 21/4017
(Continued)

FOREIGN PATENT DOCUMENTS

JP    H11198075 A    7/1999
JP    H11210021 A    8/1999
(Continued)

OTHER PUBLICATIONS

International Search Report for related PCT App No. PCT/JP2017/014594 dated Jul. 11, 2017, 11 pgs.
(Continued)

*Primary Examiner* — Dalena Tran
(74) *Attorney, Agent, or Firm* — Procopio, Cory, Hargreaves & Savitch LLP

(57) ABSTRACT

An upper limb motion support apparatus and an upper limb motion support system which are capable of significantly improving the enhancement of an operator's work efficiency and the reduction of their workload are proposed. A controller which causes an articulated arm and an end effector to perform three-dimensional motion according to the operator's intention based on a biological signal acquired by a biological signal detection unit causes the articulated arm and the end effector to perform cooperative motion in conjunction with the operator's upper limb motion by referring to content recognized by an upper limb motion recognition unit.

18 Claims, 22 Drawing Sheets

(51) Int. Cl.
    *A61H 1/02* (2006.01)
    *B25J 13/08* (2006.01)
    *B25J 15/00* (2006.01)
(52) U.S. Cl.
    CPC ............ *B25J 9/163* (2013.01); *B25J 9/1633* (2013.01); *B25J 9/1697* (2013.01); *B25J 13/085* (2013.01); *B25J 13/087* (2013.01); *B25J 15/0028* (2013.01); *A61H 2201/1659* (2013.01)
(58) Field of Classification Search
    CPC ... B25J 13/085; B25J 15/0028; A61H 1/0274; A61H 1/001; A61H 2201/5007; A61H 2201/5064
    USPC .......................................... 700/246; 600/384
    See application file for complete search history.

(56) References Cited

U.S. PATENT DOCUMENTS

| | | | | |
|---|---|---|---|---|
| 2007/0225620 | A1* | 9/2007 | Carignan | A61H 1/0281 601/5 |
| 2008/0070752 | A1 | 3/2008 | Einav et al. | |
| 2009/0281465 | A1* | 11/2009 | Fu | A61H 1/0274 601/5 |

FOREIGN PATENT DOCUMENTS

| | | |
|---|---|---|
| JP | 2004180817 A | 7/2004 |
| JP | 2004268159 A | 9/2004 |
| JP | 2004278159 A | 10/2004 |
| JP | 2008296308 A | 12/2008 |
| JP | 2009219647 A | 10/2009 |
| JP | 2011051056 A | 3/2011 |
| JP | 2013103306 A | 5/2013 |

OTHER PUBLICATIONS

Extended European Search Report directed to the EP counterpart application No. 17875082.4, dated Jul. 10, 2020, Total 9 pages.

Schätzle, S., et al., VibroTac: An ergonomic and versatile usable vibrotactile feedback device, 19th IEEE International Symposium on Robot and Human Interactive Communication, Principe di Piemonte, Viareggio, Italy, Sep. 12-15, 2010, Total 6 pages.

Notice of Reasons for Refusal for related JP App No. 2018-553640 dated Mar. 17, 2020, 10 pgs.

* cited by examiner

FIG. 8
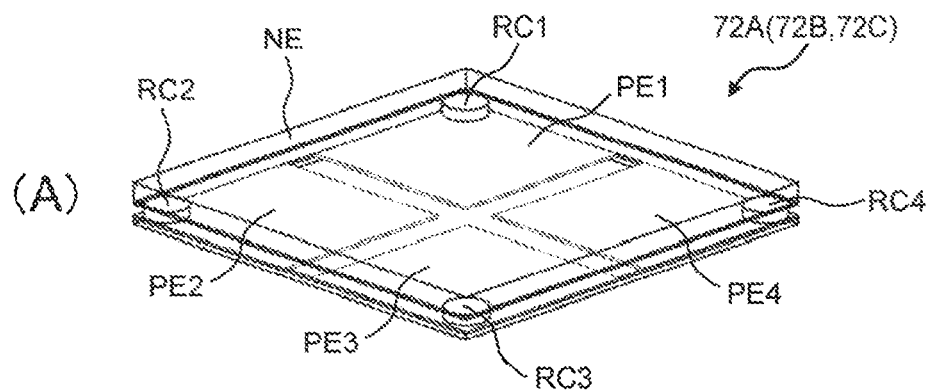
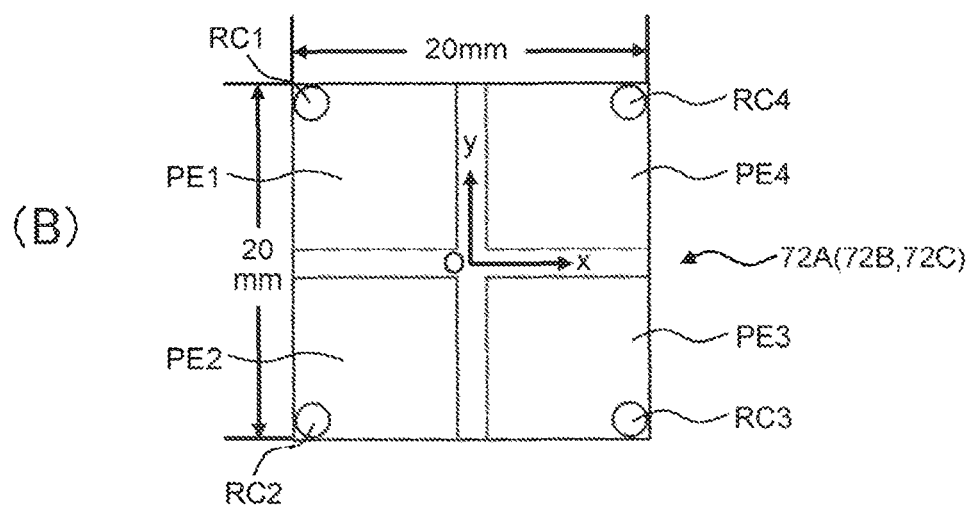
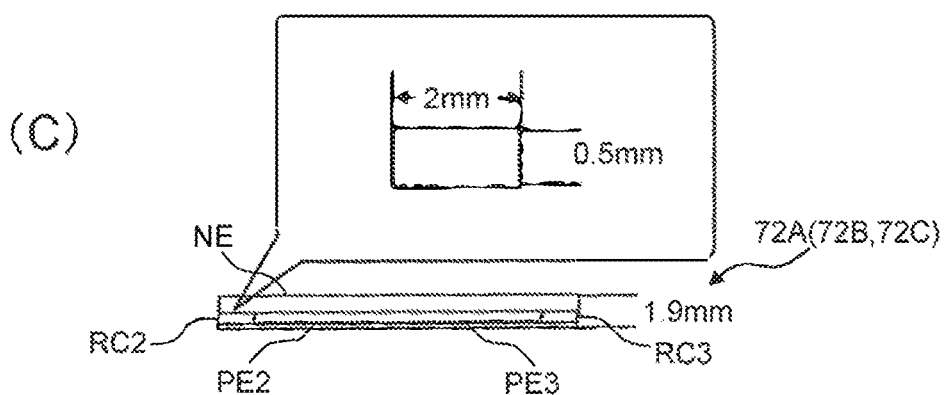

FIG. 19
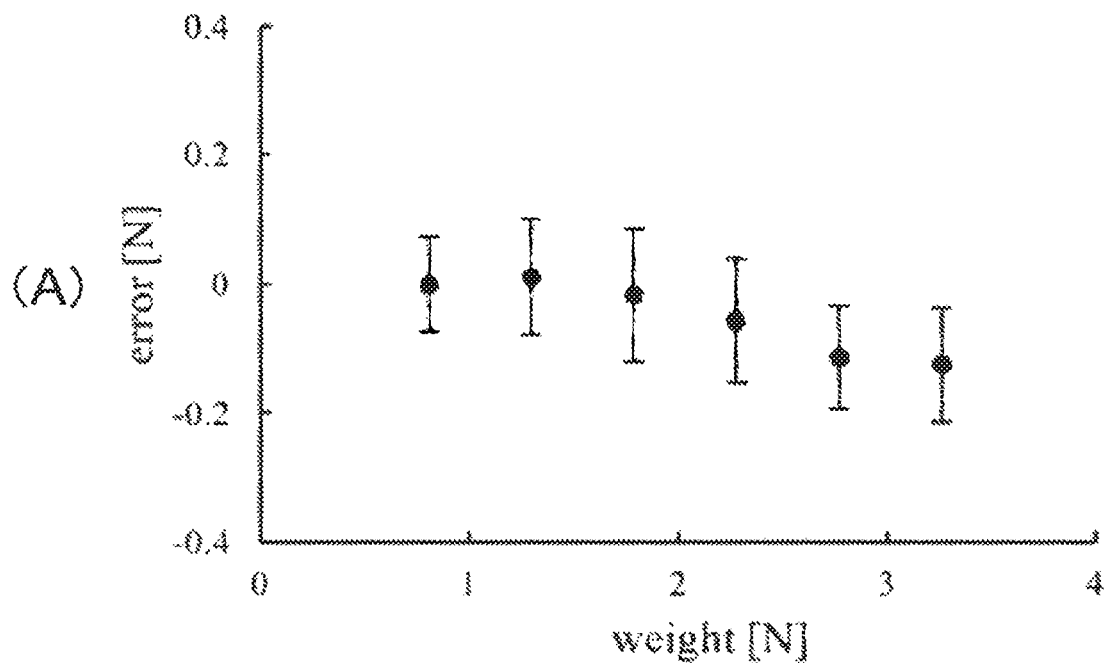
(A)
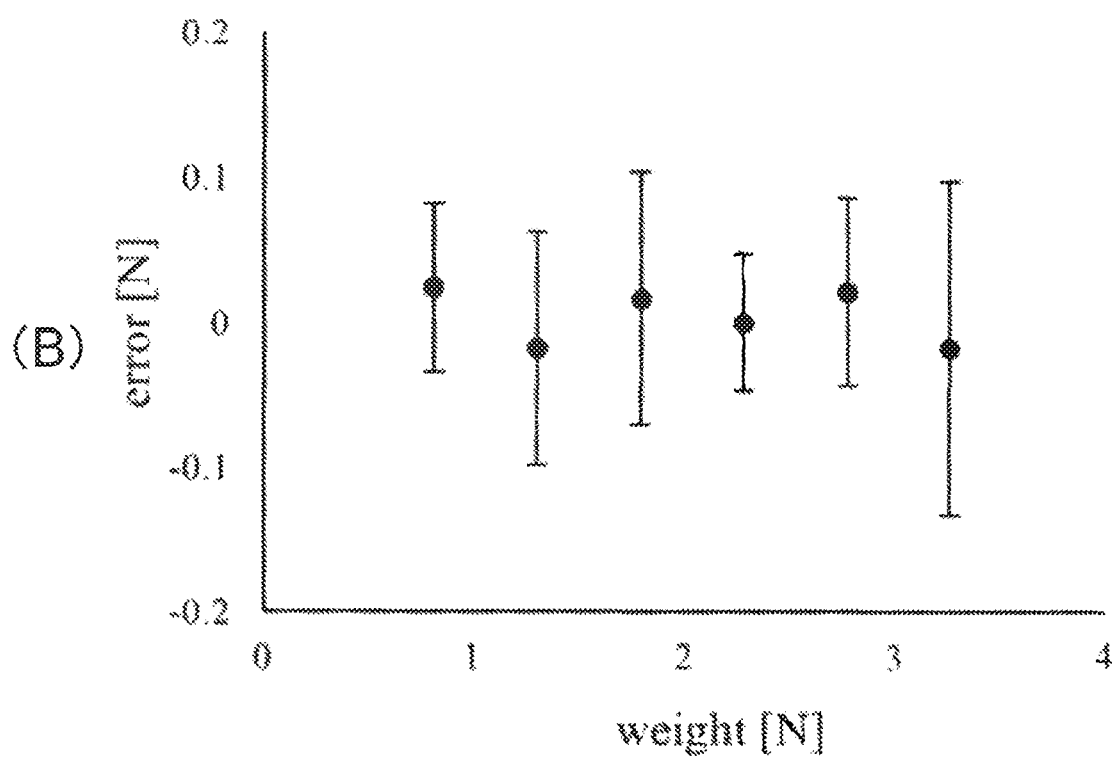
(B)

US 11,260,530 B2

UPPER LIMB MOTION SUPPORT APPARATUS AND UPPER LIMB MOTION SUPPORT SYSTEM

CROSS-REFERENCE TO RELATED APPLICATIONS

This application is a U.S. National Stage entry of PCT Application No: PCT/JP2017/014594 filed Apr. 7, 2017, which claims priority to Japanese Patent Application No. 2016-235458, filed Dec. 2, 2016, the contents of which are incorporated herein by reference.

TECHNICAL FIELD

The present invention is suited for use in an upper limb motion support apparatus and an upper limb motion support system which enable, for example, a hemiplegic person to operate a robot arm mounted on a table in coordination with the person's hand on their unaffected side.

BACKGROUND ART

When a hemiplegic person performs desktop work such as cooking or occupational motion, it is impossible to perform cooperative motion with both hands. So, this results in problems such as concentration of workload on one hand, degradation of work efficiency and its accuracy, and incapability to perform troublesome work. These problems cause significant deterioration in the hemiplegic person's QOL (Quality of Life) and become obstacles in social involvement.

As current countermeasures, attempts have been made to, for example, achieve functional improvements through rehabilitation and use welfare equipment for hemiplegic persons. However, the upper limb paralysis generally tends to have difficulty in recovery as compared to lower limb paralysis; and it is reported that complete recovery is 14% of the total and partial recovery is 25%. In other words, approximately 60% of all hemiplegic persons are in a state of no signs of recovery in the upper limb functions.

Meanwhile, since conventional welfare equipment requires the use of a different tool for each work, it is necessary to constantly carry a plurality of pieces of welfare equipment when used in life scenes. Furthermore, the degree of difficulty of work can be lowered for a hemiplegic person by utilizing the welfare equipment, but as a result all the work is conducted on their nonparalytic side, so that concentration of the workload cannot be avoided. Therefore, the welfare equipment is not appropriate as assistive equipment in the life scenes.

So, a possible solution can be a robot arm which understands the hemiplegic person's motion intention and supports motion in conjunction with their unaffected upper limb. For example, there is proposed, as a robot arm for supporting cooking work in a kitchen, a robot arm which reduces time loss by finding a candidate position for the work and work probability and minimizing a standby position (see PTL 1).

Moreover, there is proposed, as a robot system for supporting tableware setting and clearing up of dishes, a robot system which supports meal serving by using a visual sensor based on record information (see PTL 2). Furthermore, there is proposed, as a suspension-type cooperative work robot, a work robot which recognizes a relative position with a robot arm by capturing images of a work object and performs work based on the relative position (see PTL 3).

CITATION LIST

Patent Literature

PTL 1: Japanese Patent Application Laid-Open (Kokai) Publication No. 2008-296308
PTL 2: Japanese Unexamined Patent Application Publication (Translation of PCT Application) No. JP 2004-268159
PTL 3: Japanese Patent Application Laid-Open (Kokai) Publication No. 2011-51056

SUMMARY OF THE INVENTION

Problems to be Solved by the Invention

Various robot arms have been developed as described above; however, for example, regarding cooking in a desktop space and cutting of food and object assembling work in occupational motion, the hemiplegic person needs to perform the motion in the same environment when performing cooperative motion with their hand on their unaffected side. Therefore, the robot arm to be used by the hemiplegic person needs to be compact and lightweight so that a work area on the nonparalytic side will not be narrowed and the robot arm can be portable. However, there seems to be currently no system which can be sufficiently durable for practical use according to the person's own intention.

It is also desirable for not only a hemiplegic person, but also a healthy person to be able to perform the cooperative work with the robot arm regarding the desktop work. It is further expected to realize an exclusive robot arm which is specialized for an operator only if it is possible to estimate the operator's intention and provide the robot arm with learning effects.

The present invention was devised in consideration of the above-described circumstances and aims at proposing an upper limb motion support apparatus and an upper limb motion support system which are capable of significantly improving the enhancement of the operator's work efficiency and reduction of their workload.

Means to Solve the Problems

In order to solve the above-described problems, provided according to the present invention is an upper limb motion support apparatus which is mounted on a table for supporting upper limb motion of an operator and which includes: a support that is secured and retained on the table in a freely attachable and detachable manner and supports a main body of the apparatus; an articulated arm having multiple degrees of freedom, wherein a fixed end side of the articulated arm is coupled to the support and a free end side of the articulated arm is coupled to an end effector; an environment imaging unit that is provided at the support and captures images of a surrounding environment of the operator; an upper limb motion recognition unit that recognizes the upper limb motion of the operator included in the surrounding environment whose images are captured by the environment imaging unit; a biological signal detection unit that detects electric potential as a biological signal generated in association with the upper limb motion of the operator; and a controller that causes the articulated arm and the end effector to perform three-dimensional motion according to an intention of the operator on the basis of the biological signal acquired by the biological signal detection unit, wherein the controller causes the articulated arm and the end effector to perform cooperative motion in conjunction with the upper limb motion of the operator while referring to content recognized by the upper limb motion recognition unit.

As a result, the upper limb motion support apparatus can follow the operator's intention and cause the articulated arm and the end effector to perform motion in coordination with the operator's hand on their unaffected side.

Furthermore, the following are included according to the present invention: an action pattern classification unit that classifies the upper limb motion of the operator regarding each work content as action patterns composed of a time series of a sequence of motions according to the work content; and an action-related data generation unit that generates action-related data obtained by chronologically connecting combinations of the surrounding environment, whose images are captured by the environment imaging unit, and the recognized content of the upper limb motion of the operator by the upper limb motion recognition unit with respect to each of the action patterns classified by the action pattern classification unit, wherein the controller controls and adjusts the articulated arm and the end effector while estimating the motion intention of the operator based on the action-related data obtained from the action-related data generation unit.

As a result, the upper limb motion support apparatus can identify the current work content from the operator's upper limb motion and adjust the motion of the articulated arm and the end effector by estimating the action pattern, which is the same or approximate to the action pattern according to the relevant work content, as the operator's motion intention.

Furthermore, the following are included according to the present invention: a face imaging unit that is provided on a free-end side of the articulated arm or the end effector and captures a face image of the operator based on an image capture result of the environment imaging unit; and a sight line detection unit that executes processing for recognizing the face image of the operator which is captured by the face imaging unit and detects a line of sight of the operator, wherein the controller causes the articulated arm and the end effector to perform the cooperative motion in conjunction with the upper limb motion of the operator while appropriately controlling the articulated arm and the end effector so that the imaging unit captures images of the operator's face and an extended end of the operator's line of sight alternately at desired switching timing.

As a result, the upper limb motion support apparatus can follow the operator's intention while recognizing an object located at the extended end of the operator's line of sight on a real-time basis and can cause the articulated arm and the end effector to perform the motion in coordination with the operator's hand on their unaffected side.

Furthermore, the following are included according to the present invention: an action pattern classification unit that classifies the upper limb motion of the operator regarding each work content as action patterns composed of a time series of a sequence of motions according to the work content; and an action-related data generation unit that generates action-related data obtained by chronologically connecting combinations of the surrounding environment, whose images are captured by the imaging unit, the recognized content of the upper limb motion of the operator by the upper limb motion recognition unit, and a movement history of the operator's line of sight by the sight line detection unit with respect to each of the action patterns classified by the action pattern classification unit, wherein the controller controls and adjusts the articulated arm and the end effector while estimating the motion intention of the operator based on the action-related data obtained from the action-related data generation unit.

As a result, the upper limb motion support apparatus can identify the current work content from the upper limb motion of the operator and the object at the extended end of the operator's line of sight and adjust the motion of the articulated arm and the end effector by estimating the action pattern, which is the same or approximate to the action pattern according to the relevant work content, as the operator's motion intention.

Furthermore, the following are included according to the present invention: a sound collection unit that collects sound of the surrounding environment of the operator; and a language analysis unit that analyzes utterance content of the operator whose sound is collected by the sound collection unit is included, wherein the controller causes the articulated arm and the end effector to perform cooperative motion according to the utterance content on the basis of the utterance content of the operator analyzed by the language analysis unit.

As a result, the upper limb motion support apparatus can follow the operator's intention while recognizing the motion content according to the operator's utterance content on a real-time basis and cause the articulated arm and the end effector to perform the motion in coordination with the operator's hand on their unaffected side.

Furthermore, the following are included according to the present invention: an action pattern classification unit that classifies the upper limb motion of the operator regarding each work content as action patterns composed of a time series of a sequence of motions according to the work content; and an action-related data generation unit that generates action-related data obtained by chronologically connecting combinations of the surrounding environment, whose images are captured by the environment imaging unit, the recognized content of the upper limb motion of the operator by the upper limb motion recognition unit, and the utterance content of the operator by the language analysis unit with respect to each of the action patterns classified by the action pattern classification unit, wherein the controller controls and adjusts the articulated arm and the end effector while estimating the motion intention of the operator based on the action-related data obtained from the action-related data generation unit.

As a result, the upper limb motion support apparatus can identify the current work content from the operator's upper limb motion and the utterance content and adjust the motion of the articulated arm and the end effector by estimating the action pattern, which is the same or approximate to the action pattern according to the relevant work content, as the operator's motion intention.

Furthermore, according to the present invention, the action-related data generation unit generates the action-related data by chronologically connecting the movement history of the operator's line of sight by the sight line detection unit in addition to the combinations. As a result, the upper limb motion support apparatus can identify the current work content from the operator's upper limb motion, the utterance content, and the object at the extended end of the line of sight and adjust the motion of the articulated arm and the end effector by estimating the action pattern, which is the same or approximate to the action pattern according to the relevant work content, as the operator's motion intention.

Furthermore, according to the present invention, the end effector includes at least two or more finger parts capable of moving fingertips in directions closer to or away from each other and a force sensor which is provided on each fingertip of each of the finger parts and detects a pressing force applied to a work object in contact with the fingertip; wherein the articulated arm includes a joint angle detection unit which detects a joint angle of each joint securing the multiple degrees of freedom; and wherein when holding the work object by using the end effector, the controller controls a gripping force by the end effector to achieve a desired target gripping force on the basis of a detection result of the force sensor corresponding to each finger part and a detection result of the joint angle detection unit corresponding to each joint and maintains the gripping force by the end effector within an appropriate range is non-uniform even if a load applied to the fingertip of each finger part depending on a position and posture of the articulated arm.

As a result, the upper limb motion support apparatus can approach to the work object and hold it while maintaining the designated posture and can realize motion control at an arbitrary position and posture in the work environment.

Furthermore, according to the present invention, when holding the work object by using the end effector, the controller calculates a position of a load centroid relative to each force sensor on the basis of a surface friction coefficient of each finger part and then detects an external force on the work object on the basis of a movement of the load centroid.

As a result, the upper limb motion support apparatus can measure the gripping force correctly on the basis of the external force including the operator's approach on the work object even when the non-uniform load is applied to the end effector. Furthermore, it becomes possible to handle a work object of different rigidity with an appropriate gripping force.

Furthermore, the following are included according to the present invention: a gripped object recognition unit that recognizes the work object, which is an object to be gripped by the end effector, from an image capture result of an object close and adjacent to the end effector by the imaging unit; and a teaching-related data generation unit that generates teaching-related data, when a gripping motion by the end effector to hold the work object is taught by the operator, by associating a detection result of the force sensor corresponding to a pressing force of each finger part of the end effector with a recognition result by the gripped object recognition unit, wherein the controller reads the teaching-related data corresponding to a work object, which is the same as or approximate to the work object whose images are captured by the imaging unit, from the teaching-related data generation unit and controls the gripping force of the end effector on the basis of the read teaching-related data.

As a result, when recognizing the work object that is the same as or approximate to the work object regarding which the gripping motion is taught, the upper limb motion support apparatus can hold the work object with the appropriate gripping force which is stored.

Furthermore, the following are included according to the present invention: an action pattern classification unit that classifies the upper limb motion of the operator regarding each work content as action patterns composed of a time series of a sequence of motions according to the work content; and an action-related data generation unit that generates action-related data obtained by chronologically connecting combinations of the surrounding environment, whose images are captured by the imaging unit, the recognized content of the upper limb motion of the operator by the upper limb motion recognition unit, and the teaching-related data generated by the teaching-related data generation unit with respect to each of the action patterns classified by the action pattern classification unit, wherein the controller controls and adjusts the articulated arm and the end effector while estimating the motion intention of the operator based on the action-related data obtained from the action-related data generation unit.

As a result, the upper limb motion support apparatus can identify the current work content from the operator's upper limb motion and the gripping motion on the work object and adjust the motion of the articulated arm and the end effector by estimating the action pattern, which is the same or approximate to the action pattern according to the relevant work content, as the operator's motion intention.

Furthermore, according to the present invention, a stimulus imparting unit that is attached to a desired skin surface of the operator and imparts an external stimulus to the skin surface is further included, wherein when holding the work object by using the end effector, the controller causes the stimulus imparting unit to impart the external stimulus of a pattern and strength according to the gripping force by the end effector to the operator on the basis of the detection result of the force sensor corresponding to each finger part.

As a result, the operator can perceive the gripping force of the end effector on a real-time basis and reflect it in their own upper limb motion. Furthermore, the operator can feed back and adjust the gripping motion of the end effector without teaching the gripping motion to the upper limb motion support apparatus.

Furthermore, according to the present invention, a plurality of types of the end effector are prepared for each work content and the end effector can be attached in a freely attachable and detachable manner to the free end side of the articulated arm selectively according to the work content.

Furthermore, the following are included according to the present invention: the upper limb motion support apparatus: a communication unit that is provided in the upper limb motion support apparatus and transmits the action-related data obtained for each action pattern from the action-related data generation unit and control adjustment data indicating a control adjustment result of the articulated arm and the end effector corresponding to the action-related data; and data terminal equipment that is provided separately from the upper limb motion support apparatus, receives the action-related data and the control adjustment data via a communication line from the communication unit, forms the received data into a database, and stores the database in an administrative server.

As a result, the upper limb motion support system can store the content of the operator's upper limb motion and the surrounding environment with respect to the action pattern according to the work content and the control adjustment result of the articulated arm and the end effector corresponding to the above-mentioned content in the administrative server.

Furthermore, according to the present invention, regarding a data group of the action-related data and the control adjustment data stored in the administrative server, the data terminal equipment is designed to sequentially update, with respect to each action pattern, the action-related data and the control adjustment data that represent an action pattern which is the same as or approximate to the relevant action pattern.

As a result, when the worker repeats similar action patterns many times with respect to specific work content, the upper limb motion support system can accumulate those action patterns as a data group specific to the operator by sequentially updating and storing the action patterns in the administrative server.

Furthermore, according to the present invention, when the controller for the upper limb motion support apparatus transmits the action-related data and the control adjustment data representing an action pattern according to current work content to the data terminal equipment via the communication unit, the data terminal equipment reads the action-related data and the control adjustment data representing an action pattern which is the same as or approximate to the action pattern according to the relevant work content, from the data group of the action-related data and the control adjustment data stored in the administrative server and transmits the read data via the communication unit of the upper limb motion support apparatus to the controller.

As a result, the upper limb motion support system can read a data group specific to the operator with respect to an action pattern, which is closest to the action pattern according to the work content, from the administrative server and cause the articulated arm and the end effector to perform the cooperative motion which is most suited for the operator's upper limb motion.

Advantageous Effects of the Invention

The present invention makes it possible to implement the upper limb motion support apparatus and the upper limb motion support system which are capable of significantly improving the enhancement of the operator's work efficiency and the reduction of their workload by recognizing the operator's upper limb motion and causing the articulated arm and the end effector to perform the cooperative motion in conjunction with the upper limb motion.

BRIEF DESCRIPTION OF DRAWINGS

FIG. 8 is a diagram illustrating the appearance and outline of a force sensor;

FIG. 19 is a graph indicating the results of a measuring accuracy evaluation experiment including a non-uniform load;

DESCRIPTION OF EMBODIMENTS

An embodiment of the present invention will be described below in detail with reference to the drawings.

(1) Configuration of Robot System

Figure 1:
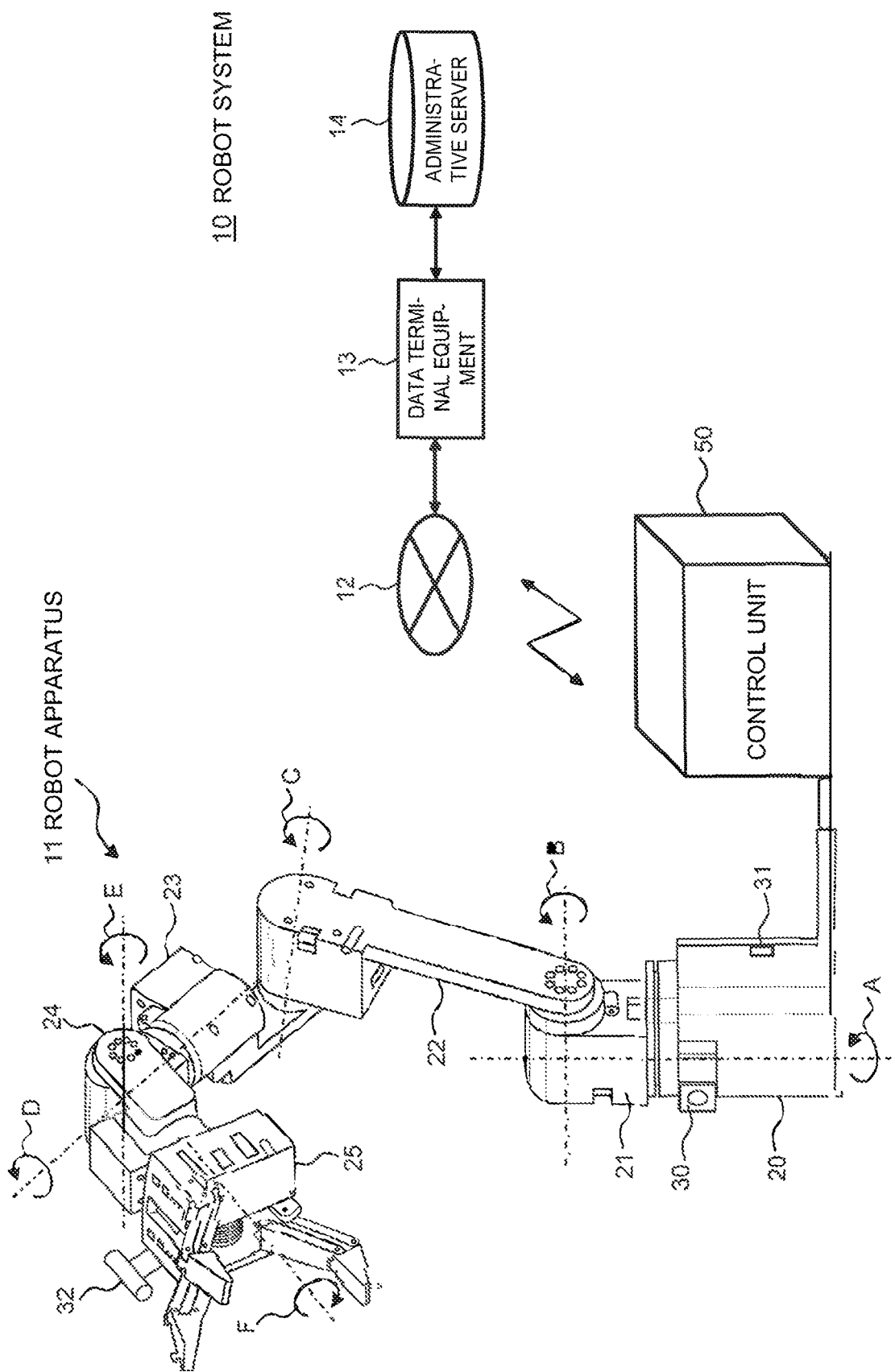
FIG. 1 is an outside drawing illustrating an overall configuration of a robot system according to an embodiment of the present invention.

FIG. 1 illustrates a robot system (upper limb motion support system) 10 according to this embodiment, which is composed of a vertical-articulated-type robot apparatus (upper limb motion support apparatus) 11 and data terminal equipment 13 and an administrative server 14 which transmit and receive various kinds of data bidirectionally to and from the robot apparatus 11 via a communication line 12.

The robot apparatus 11 includes: a support 20 which can be mounted on a table in a freely attachable/detachable manner; a shoulder part 21 coupled to the support 20 in a manner such that it can pivot in a horizontal direction; a lower arm part 22 coupled to the shoulder part 21 in a manner such that it can pivot in a vertical direction; an upper arm part 23 coupled to the lower arm part 22 in a manner such that it can pivot in a vertical direction; a wrist part 24 coupled to the upper arm part 23 in a manner such that it can pivot and twist in a vertical direction; and an end effector 25 coupled to the wrist part 24 in a manner such that it can twist.

In other words, the robot apparatus 11 is configured so that an articulated arm (the shoulder part 21, the lower arm part 22, the upper arm part 23, and the wrist part 24) having a 6 degrees of freedom is coupled to the support 20 around the respective axes (A-axis to F-axis) as rotation centers in a freely rotatable manner and the end effector 25 is attached to a tip part of the articulated arm 21 to 24.

Specifically, the support 20 and the shoulder part 21 are coupled together in a manner rotatable around A-axis; the shoulder part 21 and the lower arm part 22 are coupled together in a manner rotatable around B-axis; the lower arm part 22 and the upper arm part 23 are coupled together in a manner rotatable around C-axis; the upper arm part 23 and the wrist part 24 are coupled together in a manner rotatable around D-axis; and the wrist part 24 itself is rotatable around E-axis and the wrist part 24 is coupled to the end effector 25 in a manner rotatable around F-axis.

A joint site between the support 20 and the shoulder part 21, a joint site between the shoulder part 21 and the lower arm part 22, a joint site between the lower arm part 22 and the upper arm part 23, a joint site between the upper arm part 23 and the wrist part 24, a joint site of the wrist part 24 itself, and a joint site between the wrist part 24 and the end effector 25 are provided with actuators MA to MF (FIG. 3 described later) which are composed of, for example, DC servomotors, respectively, and are designed to be driven to rotate via a transmission mechanism which is not illustrated in the drawing.

Regarding this end effector 25, a plurality of types are prepared for each work content of the operator and the end effector 25 can be selectively attached to the wrist part 24 according to the relevant work content in a freely attachable/detachable manner; and if an actuator MG (FIG. 3 described later) is included inside the end effector 25, the end effector 25 is designed to be driven and controlled together with the articulated arm 21 to 24. For example, the end effector 25 having a gripping function with three fingers is designed to perform an opening motion or a closing motion by driving the actuator in conjunction with motion of the articulated arm 21 to 24.

Furthermore, the support 20 is electrically connected to a control unit 50, is provided at a specified site on its outside surface with an imaging unit 30 for capturing images of the operator's surrounding environment, and is further provided with a sound concentrating microphone 31 for collecting sound of the surrounding environment. Incidentally, the imaging unit 30 and the sound concentrating microphone 31 may be placed at the shoulder part 21 of the articulated arm 21 to 24.

This imaging unit (environment imaging unit) 30 is composed of a laser range sensor, an RGB-D sensor, and a 3-dimensional depth image sensor and is designed to monitor motions of the operator's hand and arm on their unaffected side.

The laser range sensor illuminates an object, as seen from an installed position, with light and calculates the distance by receiving its reflected light. By measuring this distance at certain angle intervals, fan-shaped distance information can be obtained within the range of a maximum distance of 30 m at an angle of 240 degrees on a plane surface.

The RGB-D sensor 28 has, in addition to an RGB color camera function, a depth sensor capable of measuring the distance to the object as seen from the camera and can perform 3-dimensional scanning of the object. This depth sensor is composed of an infrared sensor, captures images of the object in a state of projecting a single pattern of structured light on the object and calculates the depth of each point on the images by means of triangulation by using its parameter.

For example, when Kinect (a trade name of Microsoft) is applied as the RGB-D sensor 28, it is possible to capture images within the range of a horizontal visual field of 57 degrees, a vertical visual field of 43 degrees, and a sensor range of 1.2 m to 3.5 m and both RGB images of 640×480 pixels and depth images of 320×240 pixels can be obtained at 30 frames/second.

The 3-dimensional depth image sensor calculates information about the distance to the object in pixel units by illuminating the object with LED pulses and measuring the time required for the reflected light to reach from the object in pixel units and, at the same time, superimposing the acquired image information. This 3-dimensional depth image sensor has detection capability with higher accuracy than that of the above-mentioned RGB-D sensor and has a wider view angle than that of the laser range sensor, so that the 3-dimensional depth image sensor is useful as a complementary sensor. For example, when Pixel Soleil (a product name of NIPPON SIGNAL CO., LTD.) is applied as the 3-dimensional depth image sensor, it is possible to capture images within the range of a horizontal visual field of 72 degrees, a vertical visual field of 72 degrees, and a sensor range of 0.3 m to 4.0 m.

Furthermore, the end effector 25 or the wrist part 24 of the articulated arm 21 to 24 is equipped with an imaging camera 32 so that it can capture images at a desired position depending on the motion of the articulated arm 21 to 24.

Figure 2:
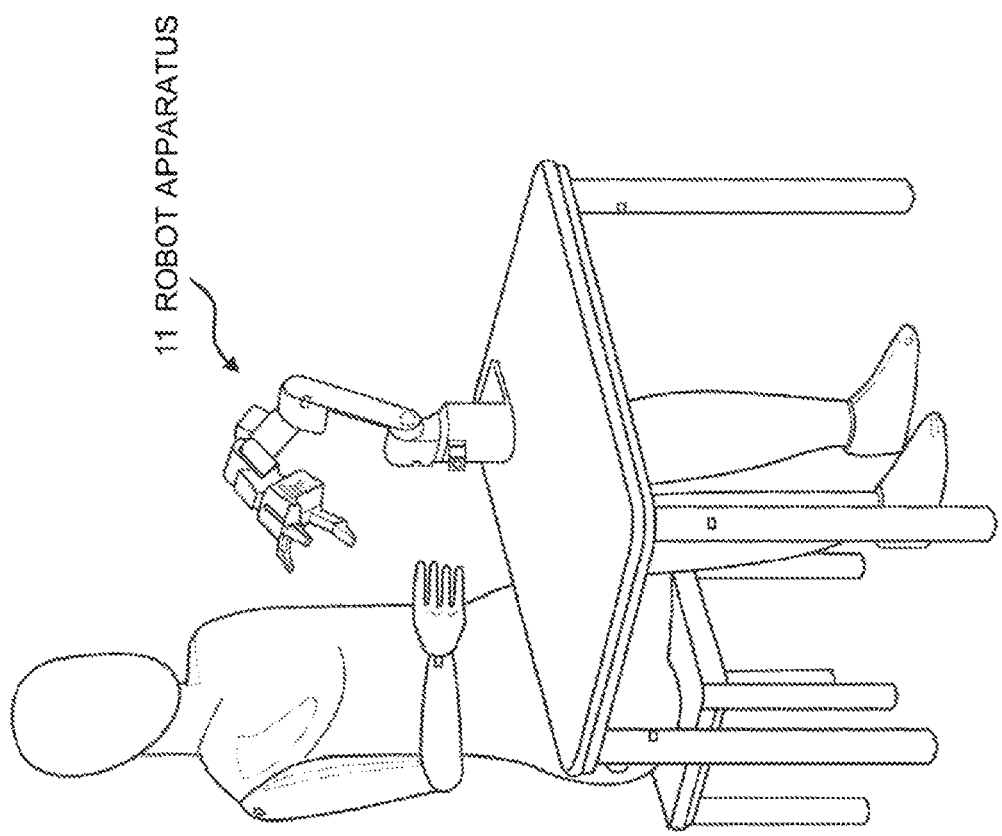
FIG. 2 is a schematic diagram illustrating an implementation example of a robot apparatus according to an embodiment of the invention.

Since the support 20 can be mounted on a table in a freely attachable/detachable manner, the robot apparatus 11 can be used by mounting the robot apparatus 11 at a desired position on the table in a state where the operator is seated on a chair at the table as illustrated in FIG. 2. Particularly when the operator is a hemiplegic person, the robot apparatus 11 can be made to perform cooperative motion instead of the operator's arm on their hemiplegic side if the robot apparatus 11 is mounted on the table on the side opposite to the operator's arm on their unaffected side.

(2) System Configuration of Control Unit in Robot Apparatus

Figure 3:
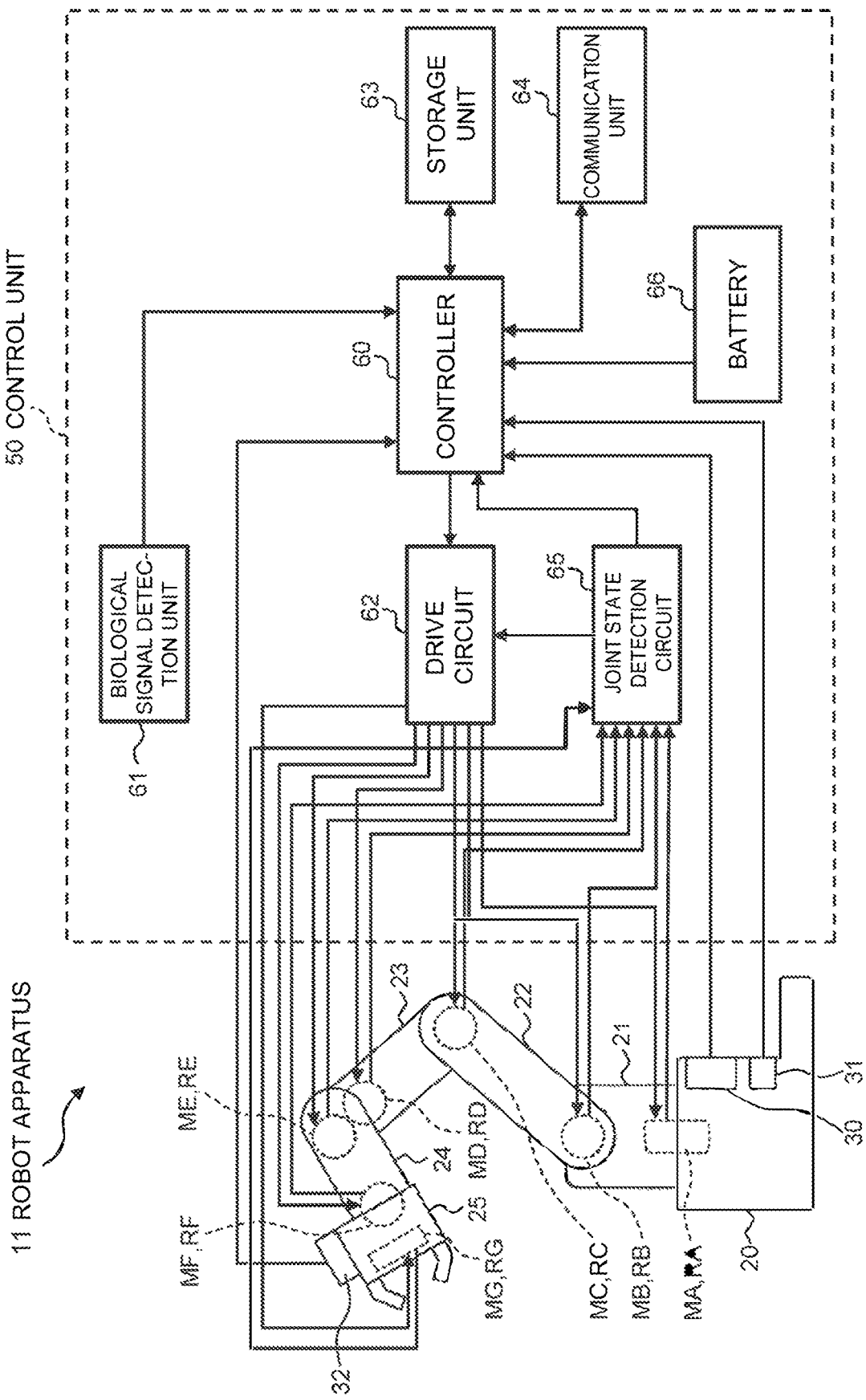
FIG. 3 is a block diagram illustrating a functional configuration of the robot apparatus according to the embodiment.

Referring to FIG. 3, the control unit 50 includes: a controller (CPU: Central Processing Unit) 60 which controls the entire robot apparatus 11; a biological signal detection unit 61 which detects an electric potential as a biological signal generated in association with the operator's upper limb motion; a drive circuit 62 which drives the actuator MA to MD of each joint of the articulated arm 21 to 24 for the robot apparatus 11; a storage unit 63 in which, for example, system programs of the entire robot apparatus are stored; and a communication unit 64 which communicates with external data terminal equipment 13.

The biological signal detection unit 61 is located on a body surface of the operator's upper arm and forearm on their unaffected side, detects a neural transmission signal transmitted from the operator's brain to the upper arm and the forearm as a biological signal, and transmits the detected biological signal to the controller 60 for the control unit 50. The controller 60 causes each actuator MA to MF for each joint of the articulated arm 21 to 24 (hereinafter including the actuator MG for the end effector 25 as necessary), via the drive circuit 62 to generate the motive power to operate the upper limb in accordance with the operator's intention on the basis of the biological signal output from the biological signal detection unit 61.

Accordingly, the controller 60 can cause the articulated arm 21 to 24 and the end effector 25 to perform three-dimensional motion in accordance with the operator's intention on the basis of the biological signal acquired by the biological signal detection unit 61.

The control unit 50 also has a joint state detection circuit 65 for detecting the state of each joint of the articulated arm 21 to 24, detects a rotation angle of each actuator MA to MG on the basis of pulse signals from rotary encoders RA to RG provided at the actuators MA to MG for the respective joints, and detects a rotation speed of each actuator MA to MG on the basis of the number of the pulse signals per unit time.

Both the rotation angles and the rotation speeds of the respective actuators MA to MG, which are detected by the joint state detection circuit 65, are supplied to the controller 60 and the drive circuit 62.

The controller 60 generates drive command values for the actuators MA to MG of the respective joints of the articulated arm 21 to 24 and the end effector 25 on the basis of the biological signal from the biological signal detection unit 61 and action command data, action learning data, and so on which are transmitted from the external data terminal equipment 13 via the communication unit 64.

The drive circuit 62 compares the drive command values for the respective actuators MA to MG, which are given from the controller 60, with the rotation angles and the rotation speeds given from the joint state detection unit 65 and supplies an electric current according to the relevant deviation to the corresponding actuator MA to MG, respectively.

Accordingly, the controller 60 can cause the articulated arm 21 to 24 and the end effector 25 to perform the three-dimensional motion so as to follow the operator's intention.

Furthermore, the controller 60 is designed to recognize the upper limb motion of the operator included in the surrounding environment on the basis of an output from the imaging unit 30 provided in the support 20 for the robot apparatus 11 and cause the articulated arm 21 to 24 and the end effector 25 to perform the cooperative motion in conjunction with the operator's upper limb motion with reference to the recognized content.

In addition to this, the controller 60 estimates the position of an upper half part of the operator's body including their face on the basis of an image capture result of the imaging unit (imaging unit) 30 and captures an image of the operator's face by using the imaging camera (face imaging unit) 32 while causing the wrist part 24 of the articulated arm 21 to 24 or the end effector 25 to perform the three-dimensional motion.

Then, the controller 60 is designed to execute processing for recognizing the operator's face from the image capture result of the imaging camera 32 and detect the operator's line of sight at the same time. Specifically speaking, face recognition processing and a sight line detection method as disclosed in, for example, Japanese Patent Application Laid-Open (Kokai) Publication No. 2007-265367 may be applied.

Specifically, regarding the face recognition processing, there is a possible method of: generating a plurality of partial images by scanning a sub-window which is made of a frame with a set number of pixels on a captured image; and discriminating the relevant partial images, which are the face, from among these partial images by using a specified pattern recognition method or a method for detecting features such as eyes and a nose.

Furthermore, regarding the sight line detection method, there is a possible method of: extracting a plurality of eye feature points from eyes in the face image detected from the entire captured image and also extracting a plurality of face feature points from the parts constituting the face; then generating an eye feature quantity indicating an eye direction by using the plurality of eye feature points and also generating a face feature quantity indicating a face direction by using the plurality of face feature points; and detecting a sight line direction by using the eye feature quantity and the face feature quantity.

Accordingly, the controller 60 can cause the articulated arm 21 to 24 and the end effector 25 to perform the cooperative motion in conjunction with the operator's upper limb motion while controlling the articulated arm 21 to 24 and the end effector 25 as appropriate so that the imaging camera (imaging unit) 32 captures images of the operator's face and an extended end of the operator's line of sight alternately at desired switching timing.

Furthermore, the controller 60 is designed to perform language analysis of the operator's utterance content based on the sound of the operator's surrounding environment which is collected by using the sound concentrating microphone 31. Specifically speaking, a sound recognition response technology capable of recognizing even combinations of words and modifiers as disclosed in, for example, Japanese Patent Application Laid-Open (Kokai) Publication No. 2010-197709 may be applied. According to the present invention, in addition to this sound recognition response technology, the operator's utterance content is identified by analyzing the language, the sound of which is recognized, and then the motion content corresponding to the utterance content is extracted by using a conversion table which is stored in the storage unit 63 in advance.

Then, the controller 60 can reflect the motion content based on the operator's utterance content, on which the language analysis has been performed, in the cooperative motion of the articulated arm 21 to 24 and the end effector 25.

Incidentally, the control unit 50 has a built-in battery 66 as a driving power source, which supplies power to, for example, the actuators MA to MG for the respective joints of the articulated arm 21 to 24 and the end effector 25, the imaging unit 30, the sound concentrating microphone 31, and the imaging camera 32.

(3) Construction of Action Execution System by Robot System

The robot system 10 in this embodiment is designed to automatically form the work content by the operator into a database as time series of a sequence of motions on the basis of the operator's surrounding environment and the operator's upper limb motion, autonomously plan actions from the operator's current state to reach a target state, and drive the articulated arm 21 to 24 and the end effector 25 to implement the intended actions.

When a human actually takes actions, they plan and carry out actions in many cases not on the basis of "individual motor units" such as "bend the elbow" and "lower the shoulder," but on the basis of "work context units" such as "cut food with a knife" and "bring food to the mouth."

In order to construct the robot system 10 which is made to intuitively execute the cooperative motion with the operator, it is effective for the robot apparatus 11 to be capable of selectively presenting, on a work context unit basis, only the motion which may possibly be performed next, from among motions which were taught in advance, to the operator based on the operator's current situation rather than the operator describing an action command by combining individual motions according to their situation and giving instructions on the work by themselves.

The individual motions in an action (for example, "bend the knee" and "lower the shoulder") are defined as "base levels" and the work context unit which is a combination of these motions (for example, "bring food to the mouth") is defined as a "meta-level" action.

In order to acquire the meta-level action, it is necessary to perceive not only the operator's own situation, but also their surrounding environmental information. This is because by perceiving the environmental information, it is possible to understand in what situation the operator is currently placed and determine how to act from the current state to reach the work target.

Specifically speaking, when performing cooking work, an action to "cut food with a knife" is presented as an action for the operator in the state of holding the knife to take if the food is placed on a chopping board; and if nothing is placed on the chopping board, an action to "(place the knife aside and then) and put the food on the chopping board" is presented.

According to the present invention, not only a technique to express actions as a series of a plurality of motions which connect the situation, but also a technique to recompose a new action by rearranging learned actions are added as meta-level action recognition using the environmental information.

Specifically speaking, the present invention uses a technique to express actions as a state transition diagram which connects the state of the work environment with motions by decomposing actions into individual motions and treating the situation of the work environment at breakpoints of the motions as the state (hereinafter referred to as "StateMap").

Although this technique results in a loss of chronological information connections between the actions, it thereby becomes possible to automatically acquire even actions, which are based on the causal relationship between the motions and have never been learned, in a database and input burdens on users can be minimized.

The advantage of expressing actions as StateMap is that as compared to a conventional motion expression technique to handle so-called "base level" motions, it becomes possible to treat actions on the basis of the "work context (meta-level)" which is composed of a combination of the base level motions, that is, on an intuitive purpose unit basis.

Accordingly, the robot system 10 realizes an action execution system for autonomously executing cooking work composed of basic motions (food cutting work with a knife) using the state transition diagram (StateMap) in which the operator's surrounding environment and the recognized content of the operator's upper limb motion are treated as the state, simply by presenting the purpose.

This action execution system is realized by three parts, that is, a "recognition system," an "acquisition system," and a "generation system." The recognition system decomposes a sequence of actions of the operator including the surrounding environment from the image capture content into the state at the breakpoints of the motions and recognizes the actions in terms of the visual sense. The acquisition system expresses and acquires the actions as automatically integrated StateMap. The generation system generates a work action given by appropriately rearranging the created state of StateMap.

(3-1) Meta-Level Expression Technique for Actions Using "StateMap"

The environment and actions are recognized at the same time and an action is decomposed into a sequence of motions which can be implemented by the robot apparatus 11. Position coordinate information of the operator and the surrounding environment at a switching point between the recognized motions is defined as the "state." The operator and the situation of the surrounding environment are associated with each other by means of the motions and the action is expressed as a sequence of motions which make a certain situation change to another situation.

As a result, actions for different purposes in separate situations will not be judged to be the same only based on motion information, but such actions can be expressed as actions having different meanings. For example, regarding motions to "press a button," one of them is an action "to operate an elevator," while the other motion is distinguished as an action to "buy a product."

Since an action is divided at switching points of motions, it is possible to easily generate a reversing action by generating reverse motions of the individual motions. Consequently, many motions can be acquired even from little information and actions can be generated more flexibly.

All the recognized actions and their reverse actions complete the same state and are integrated and expressed as one directed graph. Accordingly, learned actions make chronological information disappear and can be expressed in the meta-level as a state transition diagram representing a causal relationship between the motions and the environment.

By using such an expression, it becomes possible to not only reproduce the learned actions, but also utilize learned experiences and generate new actions. StateMap which is created by a plurality of humans and environments can be integrated by putting together common states. Consequently, elements of actions increase, and the actions can be generated more flexibly.

Using StateMap makes it possible to search for the shortest motion path from the current state to a desired state and generate a sequence of action by recomposing a plurality of decomposed motions only if the desired state to be implemented by the robot apparatus 11 is presented. It is also possible to implement new work as a combination of then-taught work by applying the learned actions.

(3-2) Method for Implementing Recognition System

A visual recognition method for recognition from the operator's upper limb motion and the surrounding environment, and the image capture result of the imaging unit 30 in the robot system 10 at the same time will be explained.

Figure 4:
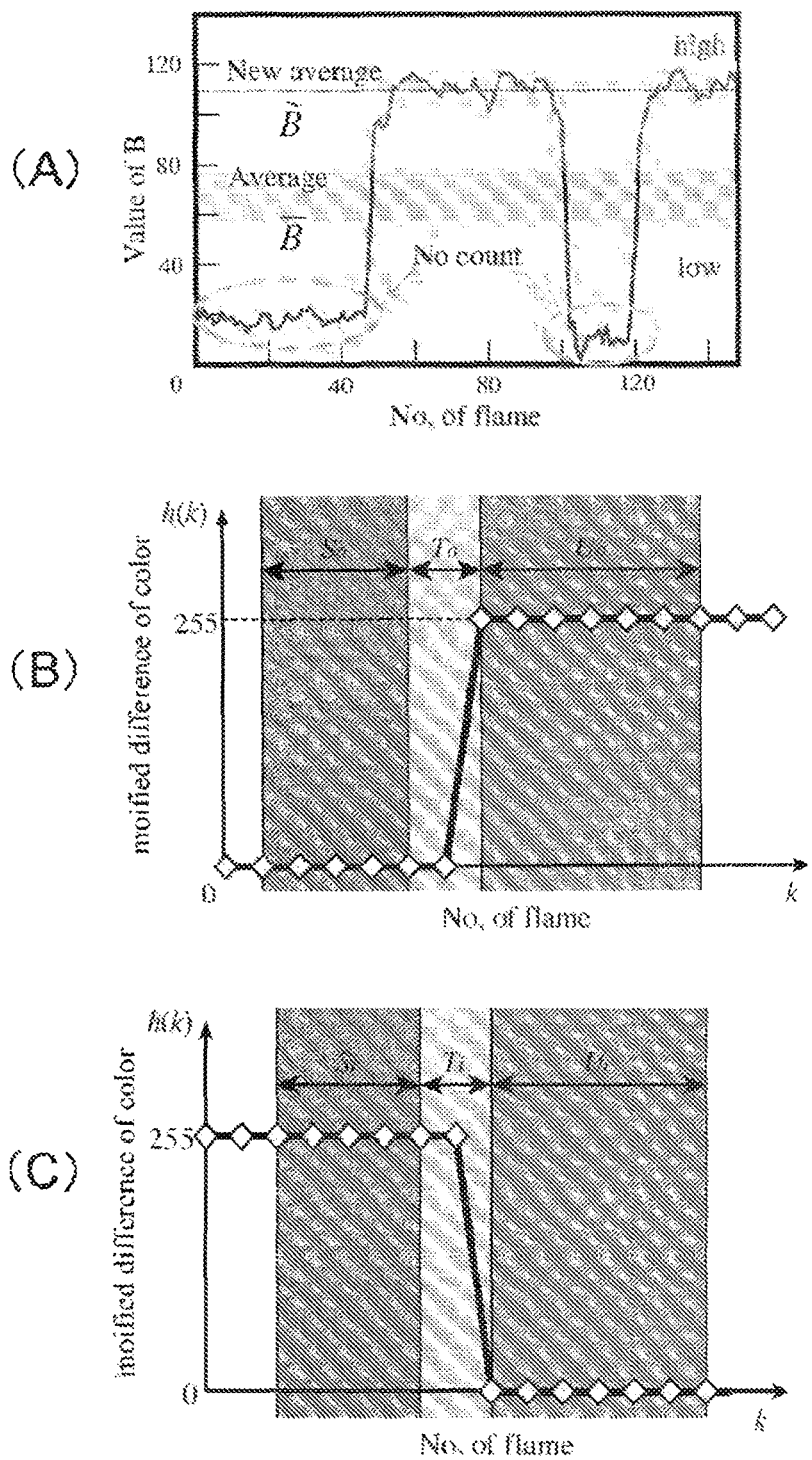
FIG. 4 is a diagram for explaining a visual recognition method according to the embodiment.

The controller 60 in the control unit 50 extracts a background image from an image capture range in a moving image from the image capture result of the imaging unit (the laser range sensor, the RGB-D sensor, and the 3-dimensional depth image sensor) 30. Specifically speaking, the controller 60 judges whether it is the background image or not, based on an average value of captured images of several frames. Under this circumstance, an average of values higher than the above-mentioned average value and an average of values lower than the above-mentioned average value are calculated, and the average of longer time is determined as the background value (FIG. 4A).

Subsequently, the controller 60 extracts a moving object(s) by using a color difference in the moving image. The difference in an RGB value (color difference), but not luminance difference, is used because the difference in colors makes it possible to utilize more information than the luminance difference. Furthermore, since the controller 60 is hardly affected by changes in the luminance by lighting and the sunlight, it has the advantage of being resistant to the changes in the luminance when continuously recognizing a sequence of work.

The color difference $h(t)(0 \leq h(t) \leq 255)$ is expressed as the following Expression (1).

[Math. 1]

$$h(t)=(R(t)-\tilde{R})^2+(G(t)-\tilde{G})^2+(B(t)-\tilde{B})^2-90\cdot(L(t)-\tilde{L}) \quad (1)$$

$L(t)$ and its average value in the above expression are expressed in the following Expressions (2) and (3), respectively.

[Math. 2]

$$L(t)=1/3\{R(t)+G(t)+B(t)\} \qquad (2)$$

[Math. 3]

$$\tilde{L}=1/3(\tilde{R}+\tilde{G}+\tilde{B}) \qquad (3)$$

Then, the controller 60 finds an area centroid of a moving object area extracted from the moving image and detects its trajectory as the operator's motion trajectory. This is in consideration of a case where two or more operators do not appear at the same time.

Subsequently, the controller 60 separates a layer for an object area from an image capture area and detects the position of the relevant object. Specifically speaking, when an object is placed within the image capture area, the object area is separated and its position is detected by executing a separation filter operation indicated in the following Expression (4) (FIG. 4B).

[Math. 4]

$$\varphi_{out}(k) = \frac{1}{255 \cdot (S_o + T_o + U_o)} \left[ \sum_{i=k-T_o-S_o}^{k-T_o} \{255 - h(i)\} + \sum_{i=k}^{U_o} h(i) \right] \qquad (4)$$

Furthermore, when the object is moved, the separated object area is coupled to a moving object area by means of a join filter operation indicated in the following Expression (5) (FIG. 4C).

[Math. 5]

$$\varphi_{in}(k) = \frac{1}{255 \cdot (T_i + S_i + U_i)} \left[ \sum_{i=k-T_i-U_i}^{k-T_i} h(t) + \sum_{i=k}^{i=U_i} \{255 - h(t)\} \right] \qquad (5)$$

Incidentally, when each of φ(k)$_{out}$ and φ(k)$_{in}$ in the above-mentioned Expressions (4) and (5) is equal to or more than 1, each filter becomes effective and the separation and joining of the object area are performed.

Subsequently, the controller 60 distinguishes the operator's upper limb motion from the motion trajectory and changes in the position of the object. In other words, the operator's upper limb motion is decomposed based on motions which can be implemented by the robot apparatus 11. Specifically speaking, the controller 60 uses an Open HRP (Open Architecture Humanoid Robotics Platform) simulator to recognize the relevant motion by replacing it with a basic motion(s) which can be implemented by the articulated arm 21 to 24 and the end effector 25 of the robot apparatus 11.

Specifically, the controller 60 extracts a centroid trajectory for a certain period of time and save coordinates at the beginning of the centroid trajectory and coordinates at its end. Then, basic motions are recognized by comparing the size of the coordinates at the end and the coordinates at the beginning with a predetermined threshold value on the X-Y plane. Then, combined parts of the basic motions are replaced in consideration of the continuity of the recognized basic motions. Accordingly, the controller 60 can distinguish the basic motions by means of conditional branches regarding trajectory waveforms within an area centroid trajectory of the object which is extracted for the certain period of time.

Consequently, the controller 60 can almost correctly recognize the operator's upper limb motion and the coordinates of the object in the surrounding environment by recognizing the operator's upper limb motion and the surrounding environment by using the above-described visual recognition method.

Figure 5A:
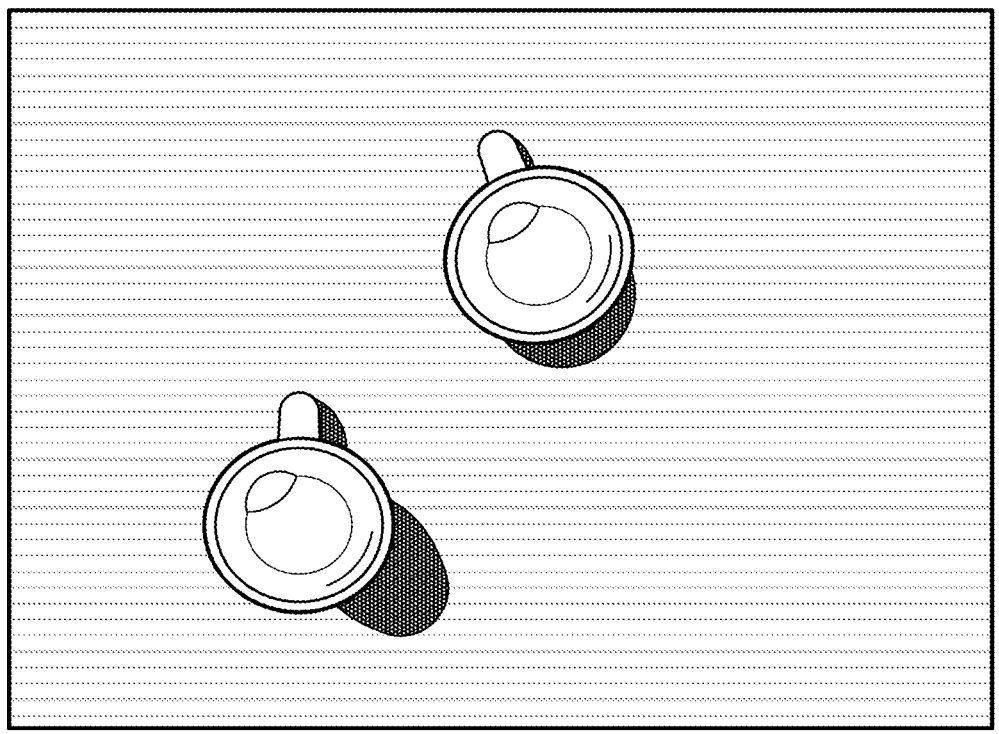
FIG. 5 is a diagram illustrating a visual recognition result according to the embodiment.
Figure 5B:
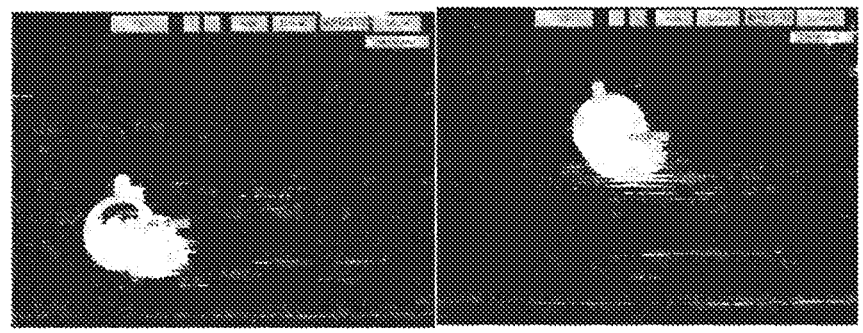
Figure 5C:
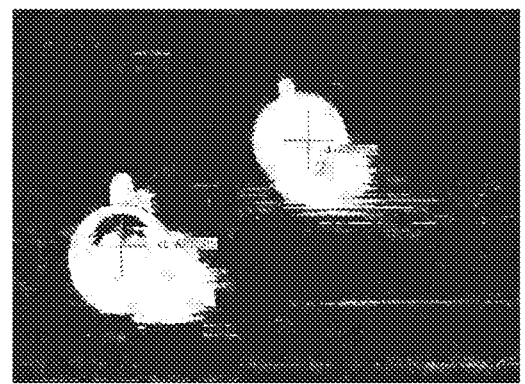

According to experiment results, an image of two cups placed on the table was captured as shown in FIG. 5A; and the above-described visual recognition method was employed, so that layers were separated for each object (cup) and were recognized as shown in FIG. 5B; and then the positions of the two cups were successfully automatically recognized by synthesizing the layers as shown in FIG. 5C.

(3-3) Method for Implementing Acquisition System

Next, the controller 60 automatically describes actions as StateMap from the operator's upper limb motion and the environmental information which have been recognized. How a plurality of actions in time series are related to each other and what process is taken are determined, that is, meanings of the actions are assigned automatically. It is also possible to automatically generate a new action by describing it as StateMap.

Firstly, the controller 60 generates position coordinate information of the operator's hand and arm on their unaffected side and the object within the surrounding environment at a switching point of the motions recognized by the visual recognition method as a state. This position coordinate information is two-dimensional coordinate information of a picture obtained from the imaging unit.

If an action is expressed as the transition of an environmental state between motions, the controller 60 can generate an action of a reverse direction by creating reverse motions of the individual motions and connecting them. Specifically speaking, the controller 60 creates the reverse motions according to a specified correspondence table with respect to the basic motions which can be implemented by the articulated arm 21 to 24 and the end effector 25 of the robot apparatus 11 by using the Open HRP simulator.

If the coordinates of the operator's upper limb and the object in the surrounding environment which constitute the state are almost the same, they can be put together as the same state and the two actions can be integrated. StateMap can be automatically created by such integration of the actions. This StateMap is not illustrated in the drawings, but StateMap is configured of a state list structure and an action database in which the content of motions corresponding to connection numbers of the states is described.

(3-4) Method for Implementing Generation System

When a target state which is the operator's intention is input, the controller 60 performs matching against situations experienced in the past from StateMap with reference to the current state, searches for a path to connect the states, and generates an action. Accordingly, by utilizing StateMap, the controller 60 can search for the shortest motion path from the current state with respect to a desired situation to be implemented by the articulated arm 21 to 24 and the end effector 25 and acquire a sequence of action as an alignment of a plurality of motions. Furthermore, under this circumstance, it is also possible to apply the learned actions and realize new work as a combination of taught work.

Incidentally, an action is generated as a sequence of motion commands having two-dimensional coordinates of a human and an object(s) as arguments; and conversion between systems is conducted in order to give this as a command to the robot apparatus 11 in the three-dimensional simulator (Open HRP). For example, regarding a motion to lift and lower the operator's upper limb, the height of the arm's centroid before and after the motion is given as the height from a top face of the table; and regarding placement and removal of an object, the position of a place to place the object on the table is determined from the coordinates where the object is recognized.

(3-5) Method for Automatically Reproducing Action by Using Action Database by "StateMap"

By using the action database expressed as the aforementioned StateMap, the controller 60 can predict and present the operator's next action and select the intended action. Since StateMap already has automatically formed the database associated with the context, it is possible to perceive action procedures and reproduce the action while automatically generating intermediate motions only by selecting a desired state to be implemented next.

How the automatic generation of an action sequence is implemented by using the action database by StateMap will be specifically explained. Regarding cooking work, each state is saved, as positional information in a three-dimensional space of fingers, in the action database.

When starting the cooking work, it is started from a "state where food (such as a Japanese radish) is placed on a chopping board"; and when StateMap is used, the database is automatically formed in association with the context, so that the next state to be implemented can be predicted as either one of a "state where the end effector presses the food down," a "state where the operator adjusts the position of the food," and a "state where the operator starts cutting with a knife."

When the operator further designates a further state ahead as a target, an action can be implemented by searching for a state transition path to reach that state. For example, when a "state where the operator cuts all the food with the knife" from the "state where the operator adjusts the position of the food" is set as the target state, a path search for the state transition map is performed and motions can be planned automatically so that the state sequentially proceeds from the "state where the operator adjusts the position of the food" through the "state where the end effector 25 presses the food down," the "state where the operator cuts the food with the knife," and then to the "state where the end effector 25 moves the food aside and keeps it there."

When a certain state proceeds to the next state, and if there are two types of actions, that is, a specific action and another different action, it is possible to resolve this by adding only a branch which needs to be selected and letting the operator select the action.

Accordingly, with the upper limb motion support system, the controller 60 always perceives the current state and can sequentially execute motions to reach the intended state while searching for only the state to which the transition can be made from the current state, by using StateMap; and an intelligent autonomous system which reduces the operator's operation burden can be realized.

(4) Motions of Robot Apparatus According to this Embodiment

In this embodiment, when the robot apparatus 11 is secured to and retained on the table in a freely attachable/detachable manner and causes the articulated arm 21 to 24 and the end effector 25 to move in coordination with the operator's upper limb motion in accordance with the operator's intention, the controller (the upper limb motion recognition unit) 60 recognizes the operator's surrounding environment and the operator's upper limb motion at the same time by mean of the imaging unit (the environment imaging unit) 30.

Consequently, the robot apparatus 11 can perceive the current work environment (such as a kitchen or a living room) and identify (or estimate) the work content (such as cooking or having a meal) by the operator at the same time. Then, the robot apparatus 11 causes the articulated arm 21 to 24 and the end effector 25 to perform the cooperative motion in conjunction with the upper limb motion with reference to the recognized content of the operator's upper limb motion.

As a result, the robot apparatus 11 can follow the operator's intention and cause the articulated arm 21 to 24 and the end effector 25 to perform motions in coordination with the operator's hand on their unaffected side.

Furthermore, the robot apparatus classifies the upper limb motion of the operator regarding each work content as action patterns composed of a time series of a sequence of motions according to the relevant work content and generates action-related data obtained by chronologically connecting combinations of the surrounding environment, whose images are captured by the imaging unit, and the recognized content of the operator's upper limb motion with respect to each of the recognized action patterns. The robot apparatus controls and adjusts the articulated arm 21 to 24 and the end effector 25 while estimating the operator's motion intention based on the action-related data.

As a result, the robot apparatus 11 can identify the current work content from the operator's upper limb motion and adjust the motion of the articulated arm 21 to 24 and the end effector 25 while estimating an action pattern, which is the same as or approximate to the action pattern according to the relevant work content, as the operator's motion intention.

Furthermore, the robot apparatus captures an image of the operator's face by using the imaging camera 32 provided in the wrist part 24 of the articulated arm 21 to 24 or the end effector 25 and the controller (the sight line detection unit) 60 executes the face recognition processing based on the image capture result and detects the operator's line of sight at the same time.

Subsequently, the robot apparatus 11 causes the articulated arm 21 to 24 and the end effector 25 to perform the cooperative motion in conjunction with the operator's upper limb motion while controlling the articulated arm 21 to 24 and the end effector 25 as appropriate so that the imaging camera 32 captures images of the operator's face and the extended end of the operator's line of sight alternately at desired switching timing.

As a result, the robot apparatus 11 can follow the operator's intention and cause the articulated arm 21 to 24 and the end effector 25 to perform motion in coordination with the operator's hand on their unaffected side while recognizing an object located at the extended end of the operator's line of sight on a real-time basis.

Furthermore, the robot apparatus 11 classifies the operator's upper limb motion regarding each work content as action patterns composed of a time series of a sequence of motions according to the relevant work content and generates action-related data obtained by chronologically connecting combinations of the surrounding environment, whose images are captured by the imaging unit 30, the recognized content of the operator's upper limb motion, and a movement history of the operator's line of sight with respect to each of the classified action patterns.

Then, the robot apparatus 11 controls and adjusts the articulated arm 21 to 24 and the end effector 25 while estimating the operator's motion intention based on the action-related data. As a result, the robot apparatus 11 can identify the current work content from the operator's upper limb motion and an object at the extended end of the line of sight and adjust the motion of the articulated arm 21 to 24 and the end effector 25 while estimating an action pattern which is the same as or approximate to the action pattern according to the relevant work content as the operator's motion intention.

Furthermore, the robot apparatus 11 collects the sound of the operator's surrounding environment by using the sound concentrating microphone 31 and analyzes the operator's utterance content from the sound collection result, and then causes the articulated arm 21 to 24 and the end effector 25 to perform the cooperative motion for the motion content according to the utterance content. As a result, the robot apparatus 11 can follow the operator's intention and cause the articulated arm 21 to 24 and the end effector 25 to perform motion in coordination with the operator's hand on their unaffected side while recognizing the motion content according to the operator's utterance content on a real-time basis.

Furthermore, the robot apparatus 11 classifies the operator's upper limb motion regarding each work content as action patterns composed of a time series of a sequence of motions according to the relevant work content and generates action-related data obtained by chronologically connecting combinations of the surrounding environment, whose images are captured by the environment unit 30, the recognized content of the operator's upper limb motion, and the operator's utterance content with respect to each of the classified action patterns.

Then, the robot apparatus 11 can identify the current work content from the operator's upper limb motion and the utterance content by controlling and adjusting the articulated arm 21 to 24 and the end effector 25 while estimating the operator's motion intention based on the action-related data, and adjust the motion of the articulated arm 21 to 24 and the end effector 25 while estimating an action pattern which is the same as or approximate to the action pattern according to the relevant work content as the operator's motion intention.

In addition, the robot apparatus 11 is designed to generate action-related data by adding the movement history of the operator's line of sight by the sight line detection unit to the combinations and chronologically connecting them. As a result, the robot apparatus 11 can identify the current work content from the operator's upper limb motion, the utterance content, and the object at the extended end of the line of sight and adjust the motion of the articulated arm 21 to 24 and the end effector 25 while estimating an action pattern which is the same as or approximate to the action pattern according to the relevant work content as the operator's motion intention.

Moreover, the robot system 10 transmits the action-related data obtained for each action pattern generated at the robot apparatus 11 and control adjustment data representing the control adjustment result of the articulated arm 21 to 24 and the end effector 25 corresponding to the action-related data to the external data terminal equipment 13 via the communication line 12.

As a result, the robot system 10 can store the content of the operator's upper limb motion and the surrounding environment with respect to the action patterns according to the work content, and the control adjustment result of the articulated arm 21 to 24 and the end effector 25 corresponding to the above in the administrative server 14.

Furthermore, the data terminal equipment 13 sequentially updates, with respect to each action pattern, the action-related data and the control adjustment data that represent an action pattern which is the same as or approximate to the relevant action pattern regarding a data group of the action-related data and the control adjustment data stored in the administrative server 14.

As a result, when the worker repeats similar action patterns many times with respect to specific work content, the robot system 10 can accumulate those action patterns as a data group specific to the operator by sequentially updating and storing the action patterns in the administrative server 14.

Furthermore, when the robot apparatus 11 transmits the action-related data and the control adjustment data representing the action pattern according to the current work content to the data terminal equipment 13 via the communication line 12, the data terminal equipment 13 reads the action-related data and the control adjustment data representing an action pattern, which is the same as or approximate to the action pattern according to the relevant work content, from the data group of the action-related data and the control adjustment data stored in the administrative server 14 and transmits the read data to the robot apparatus 11.

As a result, the robot system 10 can read the data group specific to the operator with respect to the action pattern, which is closest to the action pattern according to the work content, from the administrative server 14 and cause the articulated arm 21 to 24 and the end effector 25 to perform the cooperative motion which is most suited for the operator's upper limb motion.

(5) Method for Controlling Gripping Force of End Effector According to this Embodiment According to the present invention, the robot apparatus 11 is designed to maintain the gripping force of the end effector 25 within an appropriate range in accordance with the work object when causing the articulated arm 21 to 24 and the end effector 25 to perform the cooperative motion in conjunction with the operator's upper limb motion.

Figure 6:
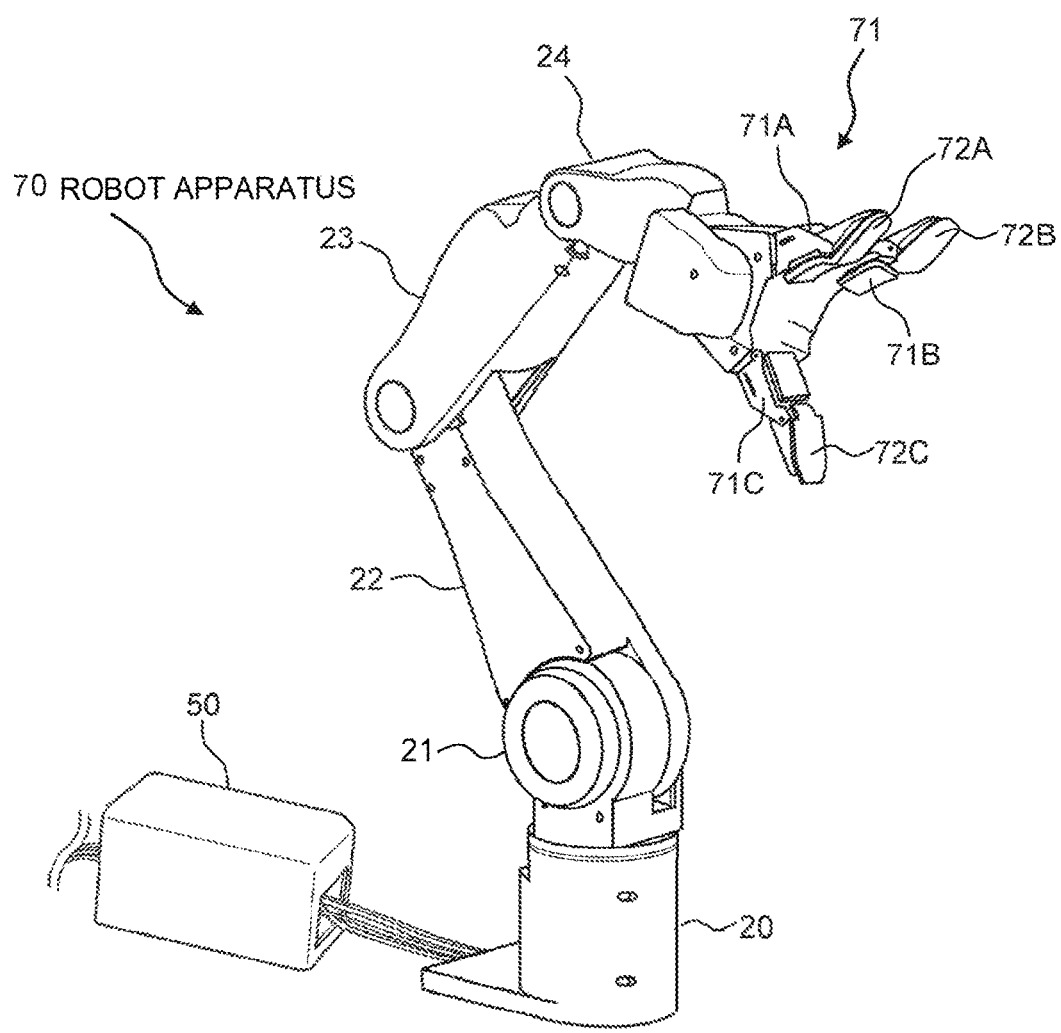
FIG. 6 is an outside drawing illustrating an overall configuration of a robot apparatus according to another embodiment.

Referring to FIG. 6 in which the same reference numerals as those in FIG. 1 are assigned to parts corresponding to those in FIG. 1, a robot apparatus 70 has almost the same configuration as that of the robot apparatus 11 as illustrated in FIG. 1, except that the configuration of an end effector 71 is different.

The end effector 71 includes: three finger parts 71A to 71C whose fingertips can move in directions closer to or away from each other; and force sensors 72A to 72C which are provided at the fingertips of the respective finger parts 71A to 71C and detect a pressing force to a work object in contact with the relevant fingertip.

The control unit 50 applies the joint state detection circuit 65 illustrated in FIG. 3 as a joint angle detection unit which detects a joint angle of each joint for which the multiple degrees of freedom in the articulated arm 21 to 24 is secured. Furthermore, each finger part 71A to 71C of the end effector 71 is designed to be movable in their gripping direction or its opposite direction by means of the actuator MG in the same manner as the end effector 25 in FIG. 3.

Then, when using the end effector 71 to hold a work object, the controller 60 for the control unit 50 controls, based on the detection results of the force sensors 72A to 72C corresponding to the respective finger parts 71A to 71C and the detection result of the joint angle detection unit corresponding to each joint, that the gripping force by the end effector 71 becomes a desired target gripping force.

Regarding the robot apparatus 70, it is assumed that a load capacity of the work object by the end effector 71 is 0.3 [kg]. According to the analysis of daily life using International Classification of Functioning, Disability and Health (ICF), it is reported that regarding the motion to lift a thing in daily life, lifting a thing of 300 [g] or more is approximately 10[%]. Therefore, consideration has been given to the possibility to think that if the thing of 300 [g] can be lifted, 90[%] of the daily life can be covered.

Figure 7:
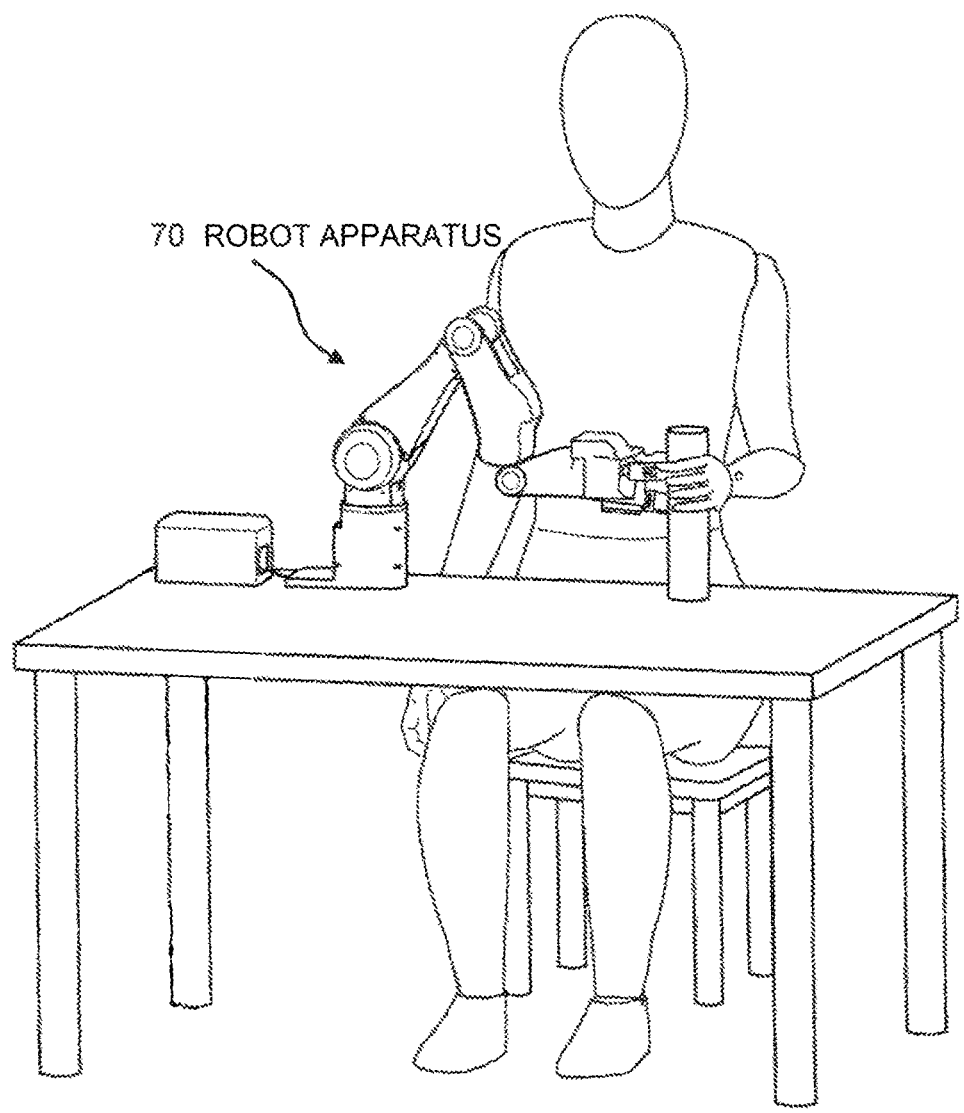
FIG. 7 is a schematic diagram illustrating an implementation example of the robot apparatus according to the embodiment of the invention.

Moreover, as illustrated in FIG. 7, it is assumed to perform the work on the table with regard to the robot apparatus 70 and a necessary work area is defined as 300 [mm]×450 [mm] which is the size of a common work sheet. It is desirable based on such required specifications that the robot apparatus 70 should have the three-finger end effector 71 and be compact and lightweight with a reach of 600 [mm] and total body weight of approximately 2.5 [kg].

Furthermore, the force sensors 72A to 72C are incorporated into the tips of the respective finger parts 71A to 71C of the end effector 71; a gel sheet which is said to have rigidity property close to human skin is pasted on their finger surfaces; and its surface is further covered with a polyurethane resin with a relatively high friction coefficient.

The so-called Pieper (D. L. Pieper) method is used to find a target joint angle to realize an arbitrary position and posture in order to control the articulated arm 21 to 24 and the end effector 71 of the robot apparatus 70. By performing angle control of each actuator MA to MG based on this, the end effector 71 can be controlled to achieve the arbitrary position and posture (trajectory control based on inverse kinematics can be performed).

This Pieper (D. L. Pieper) method is a method for analytically finding the inverse kinematics when the robot arm with the 6 degrees of freedom is configured so that all three continuous joints out of the six joints are rotational joints and extended lines of their three rotation axes intersect with each other at one point.

Subsequently, when the end effector 71 of the robot apparatus 70 holds a work object, a non-uniform load is applied to the surface of each finger part 71A to 71C. The non-uniform load herein means a load with its centroid position existing at a part other than the center of the force sensor 72A to 72C.

In order to detect the generated gripping force in a work object holding state, it is necessary for the force sensor 72A to 72C to be capable of measuring even the non-uniform load. It is also necessary to be capable of detecting an external force including the operator's approach on the work object. Since the force measured by the force sensors 72A to 72C is a resultant force of the gripping force and the external force, the external force including the operator's approach can be detected only if the load centroids of the force sensors 72A to 72C can be measured.

A friction coefficient μ of the finger surface of the finger part 71A to 71C of the end effector 71 in contact with the work object is 0.75 to 1.15, so that 2 μF>0.3×9.8 needs to be satisfied in order to hold an object of 300 [g]. Accordingly, a maximum required gripping force Fmax becomes 1.96 [N] when the friction coefficient is a minimum value. Furthermore, it is reported that when a person holds a thing, they generally exerts a force approximately 1.4 times as large as the minimum required force. Therefore, when the range up to the maximum value of a person's gripping force is assumed to be a measurement range, the force sensor 72A to 72C has the required specifications to measure up to 1.96× 1.4 [N]=2.744 [N](=280 [gf]) and their measurement range is set as 0 to 2.94 [N](=0 to 300 [gf]).

The robot apparatus 70 in this embodiment uses electrostatic-capacity-type force sensors as the respective force sensors 72A to 72C incorporated into the tips of the respective finger parts 71A to 71C of the end effector 71. This electrostatic-capacity-type force sensor includes, as illustrated in FIG. 8A to FIG. 8C, four rubber cylinders RC1 to RC4 to support the four corners of a movable electrode (negative electrode) NE and four electrodes (ch) PE1 to PE4 as fixed electrodes (positive electrodes) so that the gripping force including the non-uniform load and the load centroid can be measured.

Figure 9:
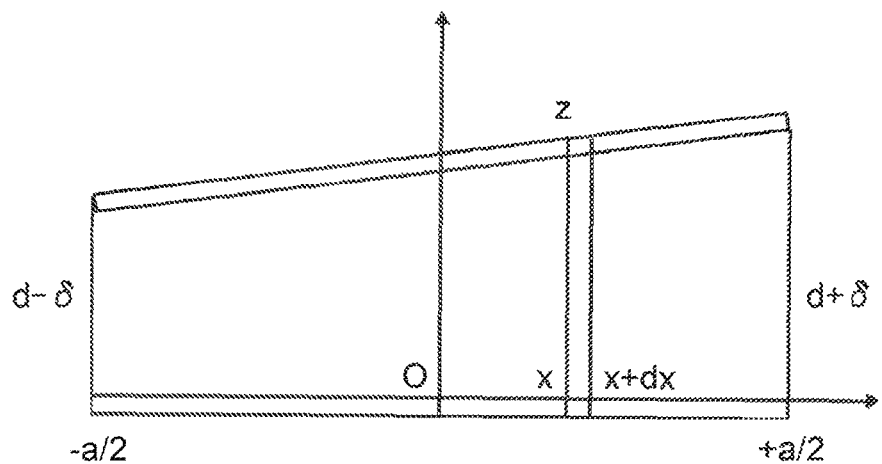
FIG. 9 is a schematic diagram for explaining non-uniform load measurement principles.

Firstly, the measurement principles for the non-uniform load will be explained. In an x-z coordinate system which is a sectional view illustrated in FIG. 9, a case where a minute slope δ has occurred in the x-direction is considered. When $\varepsilon_0$ represents a vacuum dielectric constant and the lengths of the respective sides of the electrode plate are a and b, a minute electrostatic capacity dC in this case is as indicated in the following Expression (6).

[Math. 6]

$$dC = \frac{\varepsilon_0 b dx}{d + (2\delta/a)x} \quad (6)$$

Therefore, the entire electrostatic capacity C is expressed as in the following Expression (7) by integrating Expression (6) in the x-direction.

[Math. 7]

$$C = \int_{-\frac{a}{2}}^{\frac{a}{2}} \frac{\varepsilon_0 b dx}{d + (2\delta/a)x} = \frac{\varepsilon_0 ab}{2\delta} \ln\left(\frac{1 + \delta/d}{1 - \delta/d}\right) \quad (7)$$

When δ<<d is satisfied in the above Expression (7), the electrostatic capacity C can approximate the following Expression (8).

[Math. 8]

$$C = \lim_{\delta \to 0} \frac{\varepsilon_0 ab}{2\delta} \ln\left(\frac{1 + \delta/d}{1 - \delta/d}\right) = \frac{\varepsilon_0 ab}{2\delta} \lim_{\delta \to 0} \frac{\ln\left(\frac{1 + \delta/d}{1 - \delta/d}\right)}{\delta} \quad (8)$$

$$= \frac{\varepsilon_0 ab}{2\delta} \lim_{\delta \to 0} \frac{\ln\left(\frac{1 + \delta/d}{1 - \delta/d}\right)'}{\delta'} = \frac{\varepsilon_0 ab}{2} \frac{2}{d} = \frac{\varepsilon_0 ab}{d}$$

When the rubber cylinders can approximate linear springs within the calculated measurement load range, the distance d becomes constant if the loads are the same even in the case of the non-uniform load; and, therefore, a change amount of the electrostatic capacity also becomes constant. If the change amount of this electrostatic capacity is converted into the force strength, the force strength can be measured even if the load is non-uniform.

Figure 10:
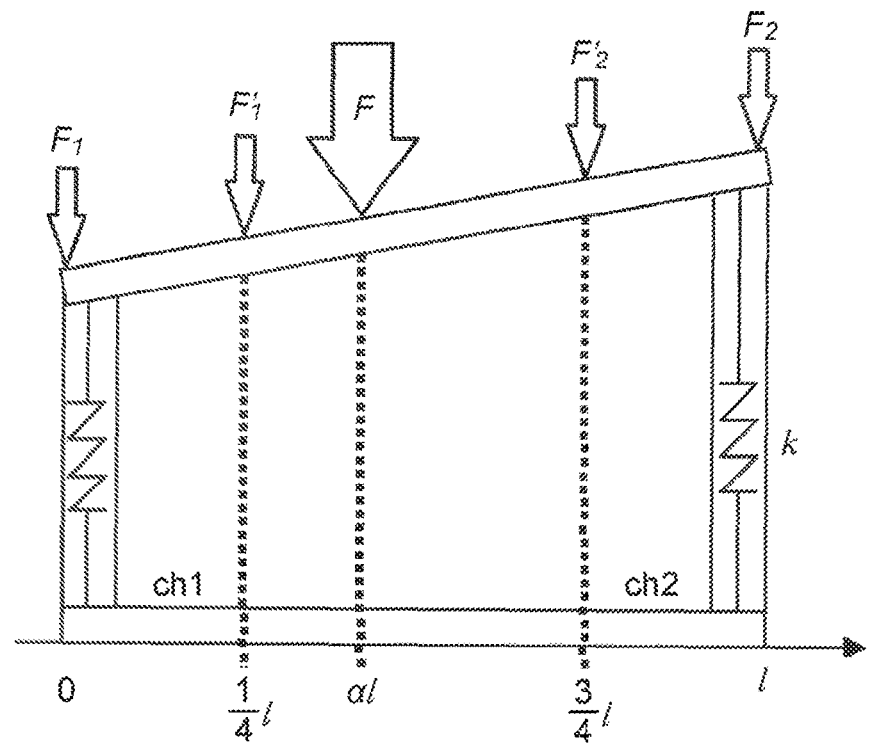
FIG. 10 is a schematic diagram illustrating sensor sections when a non-uniform load is applied.

Next, a method for measuring the load centroid will be explained. FIG. 10 illustrates a sectional view of the force sensors 72A to 72C when the non-uniform load is applied. Now, mathematical expressions in a case of a slope in the x-direction will be found; however, the same can be applied also to the y-direction. Firstly, forces F1' and F2' are calculated assuming that the force is applied to the center of each channel. Since the forces are actually applied to the rubber cylinders at the right and left edges, the forces applied to the respective rubber cylinders are as indicated in Expressions (9) and (10), respectively.

[Math. 9]

$$F_1 = F'_1 + \frac{F'_1 - F'_2}{2} \quad (9)$$

[Math. 10]

$$F_2 = F'_2 + \frac{F'_2 - F'_1}{2} \quad (10)$$

Therefore, a spot a to which the resultant force F is applied is as indicated in the following Expression (11).

[Math. 11]

$$\alpha = \frac{F_2}{F_1 + F_2} \quad (11)$$

By applying this to the x-direction and the y-direction, the spot to which the resultant force F is applied, that is, the position of the load centroid is calculated.

Figure 11:
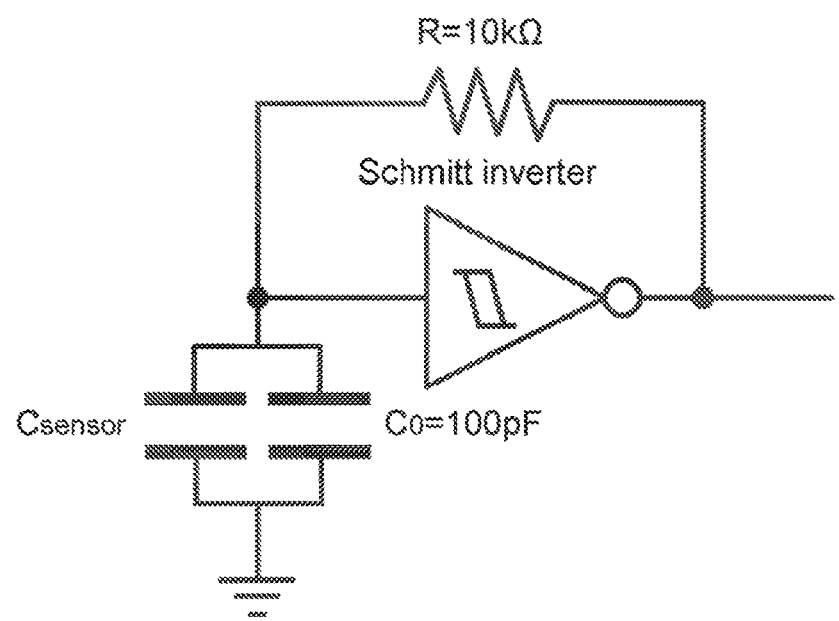
FIG. 11 is a circuit diagram of an oscillation system which constructs a force sensor.

Since the force sensor 72A to 72C according to the present invention is incorporated into the relevant finger part 71A to 71C of the end effector 71, it is configured in a relatively compact size. Since the electrostatic capacity is proportional to the area of the electrode plate according to Expression (8), it becomes very minute. In order to measure changes in this minute electrostatic capacity, an oscillation system illustrated in FIG. 11 is constructed by using four capacitors and a Schmitt trigger inverter of the force sensor 72A (72B, 72C) and changes in the electrostatic capacity are found as changes in an oscillating frequency by counting pulses in a certain period of time.

The following Expression (12) shows that a relational expression between the electrostatic capacity and the oscillating frequency calculates an increase (or decrease) in the electrostatic capacity as a decrease (or increase) of the oscillating frequency.

[Math. 12]

$$f = \alpha \frac{1}{R(C_0 + C_{Sensor})} \quad (12)$$

Regarding this Expression (12), $C_{sensor}$ represents an electrostatic capacity of a capacitor of the force sensor 72A (72B, 72C), a represents an oscillation constant by the Schmitt trigger inverter, R represents resistance, f represents the oscillating frequency, and $C_0$ represents an electrostatic capacity for adjusting the oscillating frequency to a frequency which can be easily counted.

The load supported by each rubber cylinder can be found by calculating the relational expression between the changes in the electrostatic capacity, which is measured as the oscillating frequency for each electrode (ch), and the load. A sum of the loads supported by the respective rubber cylinders becomes a gripping force value and the position of the load centroid is found according to the above-mentioned Expression (11).

Figure 12B:
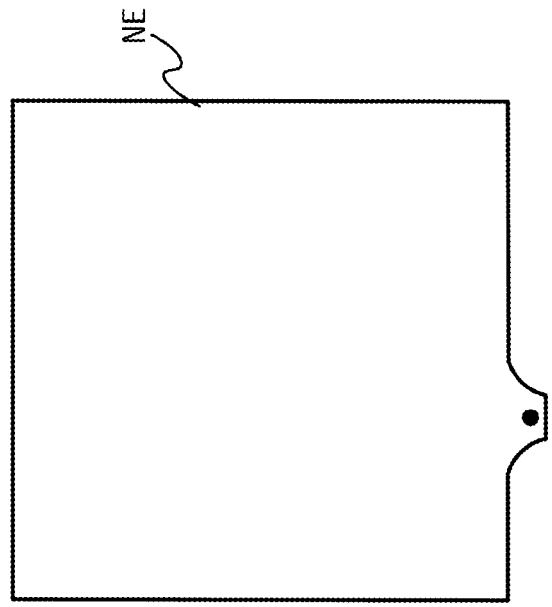
FIG. 12 is a top view illustrating positive electrodes and a negative electrode which configure the force sensor.
Figure 12A:
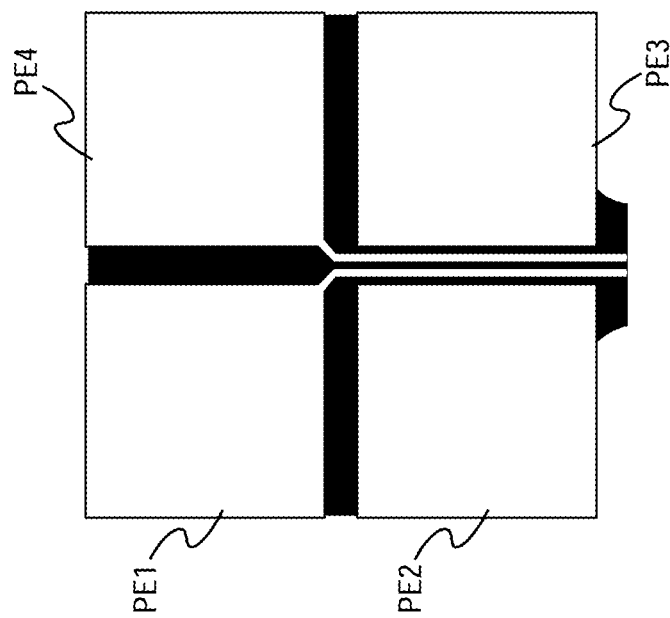

Now, FIG. 12 shows fixed electrodes (positive electrodes) (FIG. 12A showing an undersurface of the sensor) PE1 to PE4 and a movable electrode (negative electrode) (FIG. 12B showing an upper surface of the sensor) NE which are actually produced. The rubber cylinder for each electrode was molded with a 3D printer by using a rubber-like material with Shore hardness 27. A silicone-based adhesive was used to bond the respective components. When a path (wiring) for transmitting pulses between the oscillation system and a measurement system is longer, changes in a resistance value due to external noise and movements or bending of the wiring become larger, which results in degradation of the measuring accuracy. Therefore, a measure against the noise is provided by implementing the measurement system of the oscillating frequency using a compact substrate, incorporating the substrate into the finger parts of the end effector, and transmitting an A/D converted value to a control layer.

Next, an explanation will be provided about calibration for applying a vertical load to the center part of each force sensor 71A to 71C. It is necessary to develop and set a relational expression between the load and the electrostatic capacity by means of the calibration in order to convert a change in the electrostatic capacity, which is measured as the oscillating frequency, into a pressure value. Load measurement principles make it possible to perform the calibration via a vertical load on the center part of the sensor.

The movable electrode (the negative electrode) of each force sensor 71A to 71C is supported by the four rubber cylinders as shown in the aforementioned FIG. 8A to FIG. 8C. Regarding the non-uniform load, the maximum load which is concentrated on one rubber cylinder is 300 [g]. Since the calibration is performed by applying the load at the center of the sensor, balance weights of 0 to 1,200 [g] are placed by adding 200 [g] each time and a reduced amount from the initial number of pulses (load 0 [g]/hour) at each load is recorded. The above-described procedure is repeated five times, an average of the reduced amount of the number of pulses is calculated, a graph of the load and the reduced amount of the number of pulses is plotted. Then, an approximation equation for each of the 4 ch (four electrodes) is calculated, thereby completing the calibration. As a result of the calculation of the approximation equation via a quadratic function, a determination coefficient $R^2$ was 0.99979.

Firstly, the difference $F_{diff}$ between a target gripping force value $F_{target}$ and a current gripping force value $F_{now}$ is calculated as illustrated in the following Expression (13).

[Math. 13]

$$f_{diff} = f_{target} - f_{now} \quad (13)$$

Holding with the target gripping force is realized by feeding back the gripping force value $F_{diff}$ of this difference and increasing/decreasing the next target angle $\theta_{t+1}$ for the angle control. This target angle $\theta_{t+1}$ is expressed as the following Expression (14).

[Math. 14]

$$\theta_{t+1} = \begin{cases} \theta_t + \Delta\theta_1 & (f_{diff} \leq f_{th1}) \\ \theta_t & (f_{th1} < f_{diff} \leq f_{th2}) \\ \theta_t - \Delta\theta_2 & (f_{th2} \leq f_{diff}) \end{cases} \quad (14)$$

Regarding this Expression (14), $f_{th1}$ and $f_{th2}$ represent threshold values and $\Delta\theta_1$ and $\Delta\theta_2$ represent control parameters.

Figure 13:
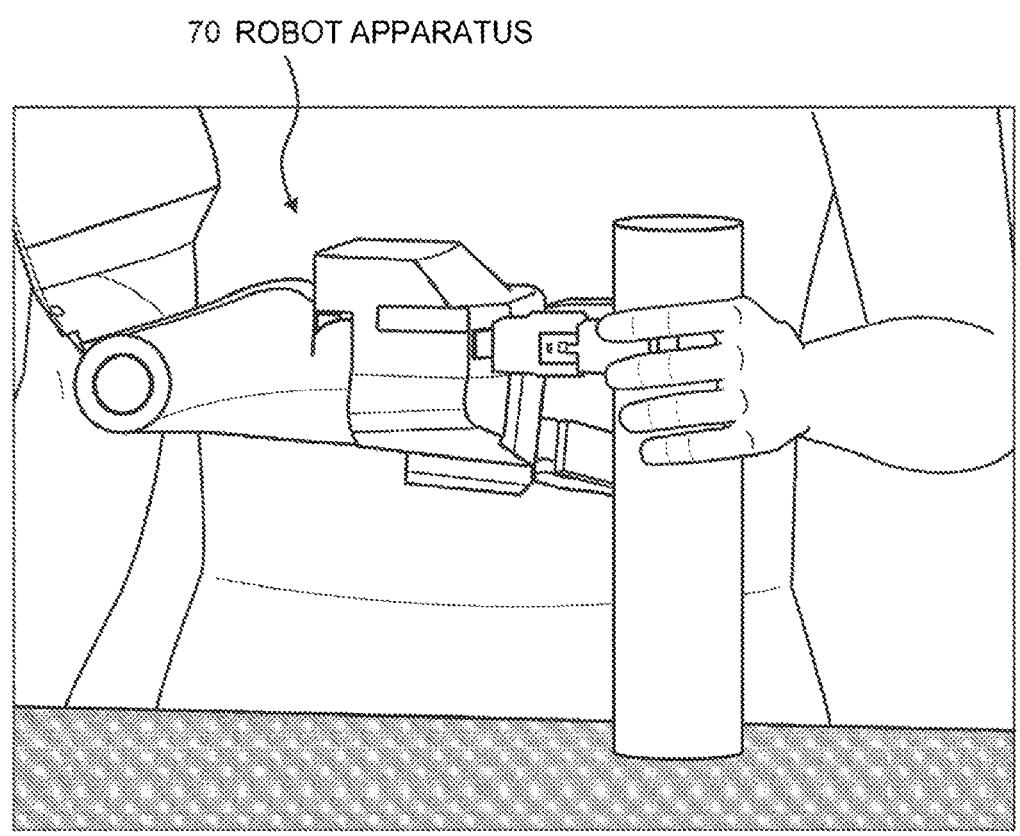
FIG. 13 is a partial view illustrating a state of teaching a gripping motion to an end effector.

The operator holds a work object together with the end effector 71 by placing their hand over, and covering, the end effector 71 in order to teach the gripping force by the end effector 71 of the robot apparatus 70 as illustrated in FIG. 13. When this is done, the controller 60 for the control unit 50 stores the gripping force measured by the force sensor 72A to 72C corresponding to each finger part 71A to 71C. Accordingly, it becomes possible to teach an appropriate gripping force for each work object.

Next, an experiment is performed to evaluate the measuring accuracy of the gripping force by the end effector 71 of the robot apparatus 70. The possibility to control the position and posture of the articulated arm 21 to 24 and the end effector 71 based on the inverse kinematics is checked by approaching to and holding an object with known coordinates while maintaining a designated posture.

Figure 14:
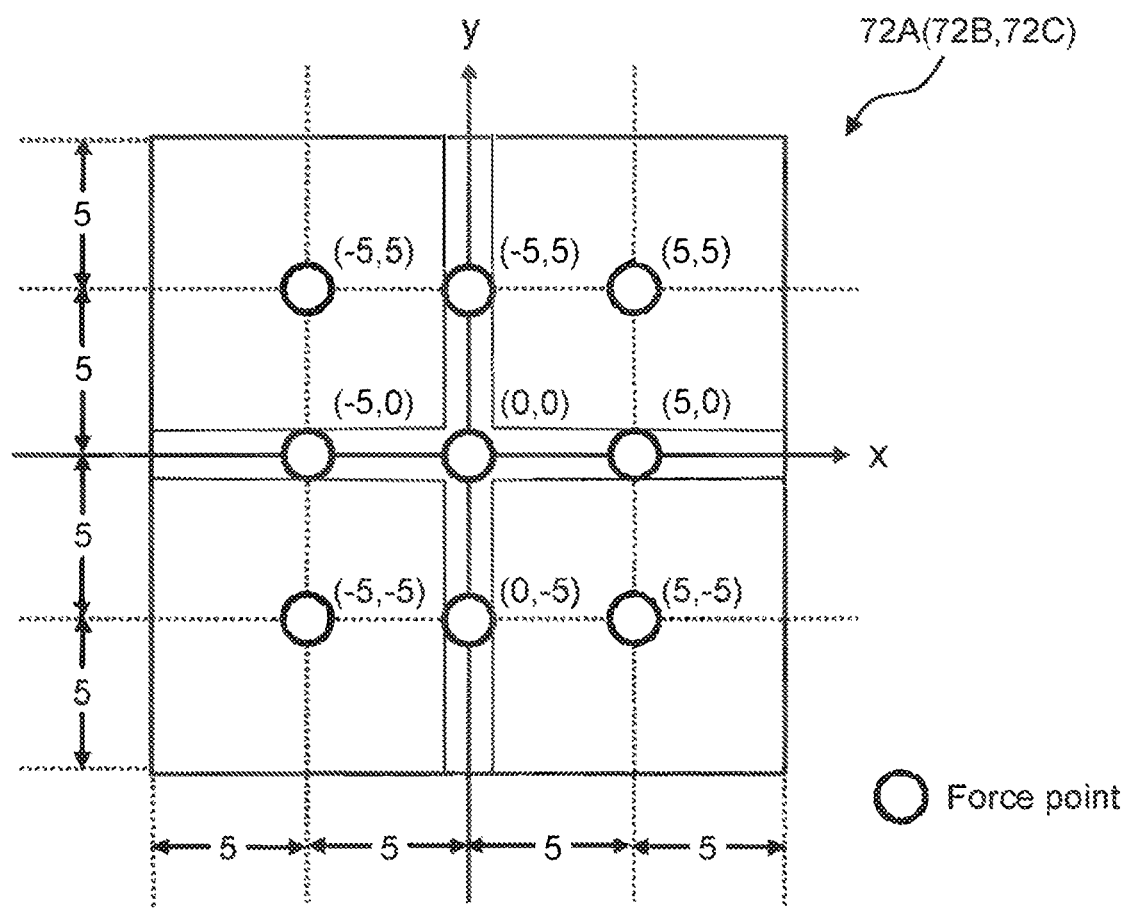
FIG. 14 is a schematic diagram for explaining measuring accuracy evaluation of calibration.

Regarding the load, a vertical load is applied to each of nine positions indicated in FIG. 14 at the center area of the force sensor 72A to 72C by means of the calibration described above. Regarding weights, a total of six types of weights, that is, 82.6 [g], 132.6 [g], 182.6 [g], 232.6 [g], 282.6 [g], 332.6 [g] which are balance weights plus the weight of a tray for the load are used. To perform a work process of putting the weights on the load tray, measuring the load and the load centroid coordinates by using the force sensor 72A to 72C, and then removing the weights, once each time for a total of six times is counted as one trial. Regarding the center position of the sensor, five trials are performed each time to evaluate the measuring accuracy regarding the uniform load and one trial is performed each time regarding other positions.

Holding the work object is carried out and with what degree of accuracy relative to the designated gripping force the work object is held is checked based on a measured load value of each force sensor 72A to 72C. The closing motion of the finger parts 71A to 71C of the end effector 71 is started 5 [s] after the start of the experiment and then the finger opening motion is started at 20 [s]. The gripping force value is recorded until 25 [s] and then the experiment is terminated. Incidentally, regarding the shape of the work object, a cylinder which is used for common gripping evaluation was used (FIG. 13).

Figure 15A:
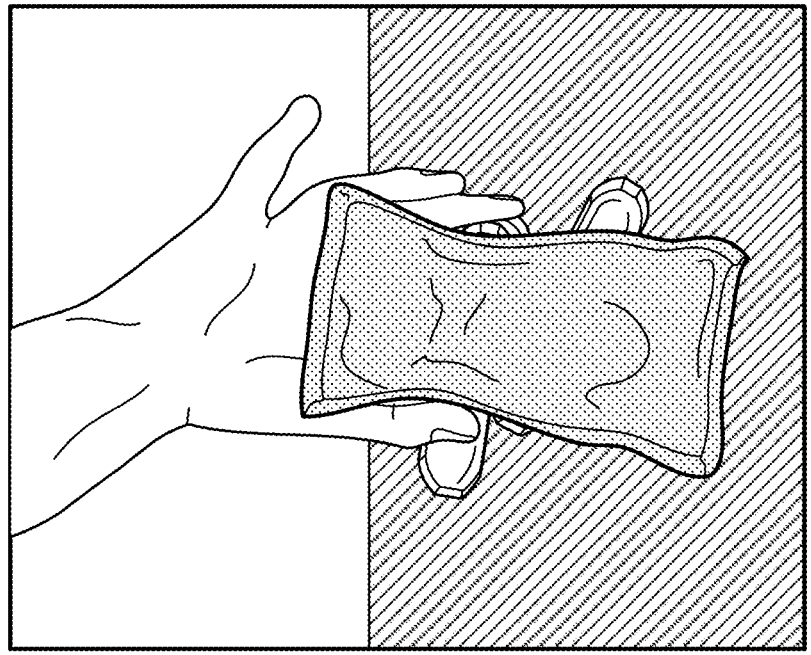
FIG. 15 is a diagram showing an image to teach a gripping force and an image of a replication motion when the gripping force is relatively strong.
Figure 15B:
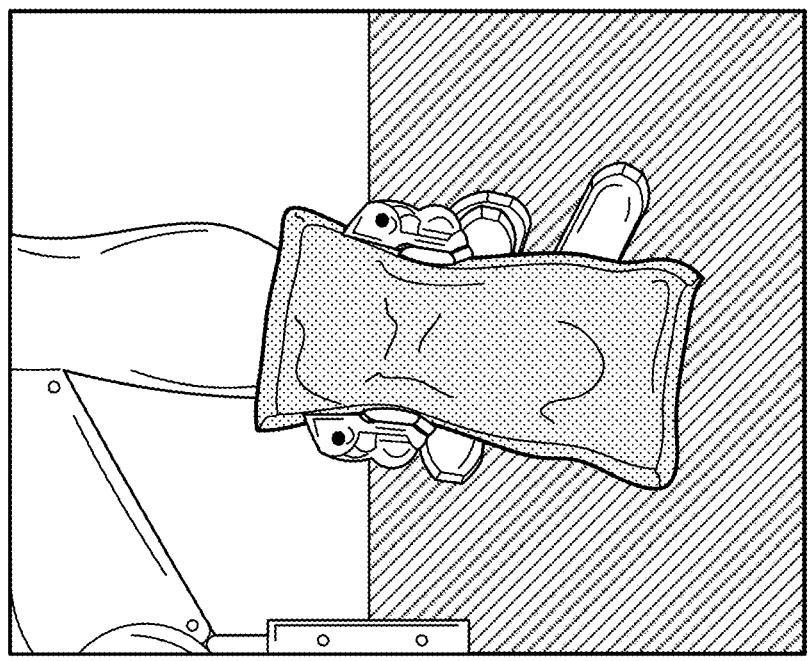
Figure 16A:
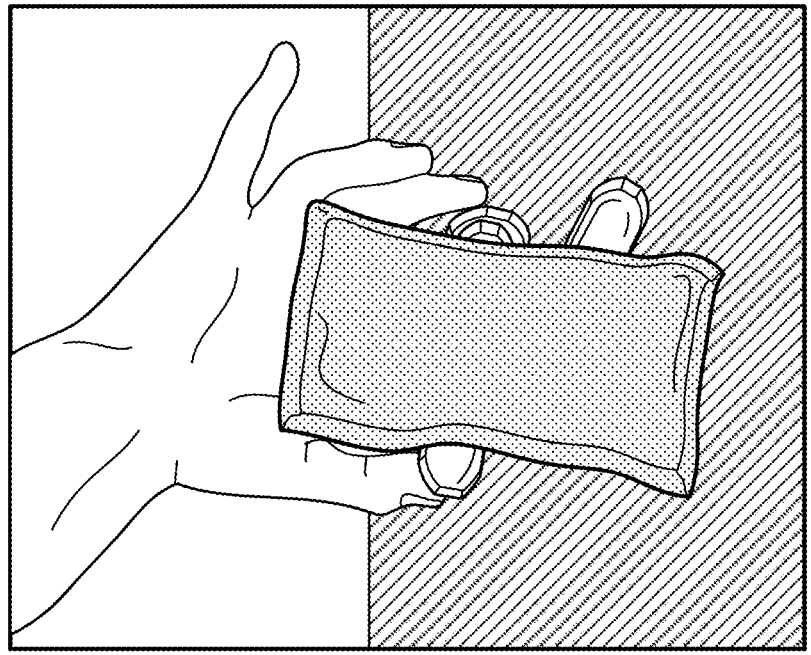
FIG. 16 is a diagram showing an image to teach a gripping force and an image of a replication motion when the gripping force is relatively weak.
Figure 16B:
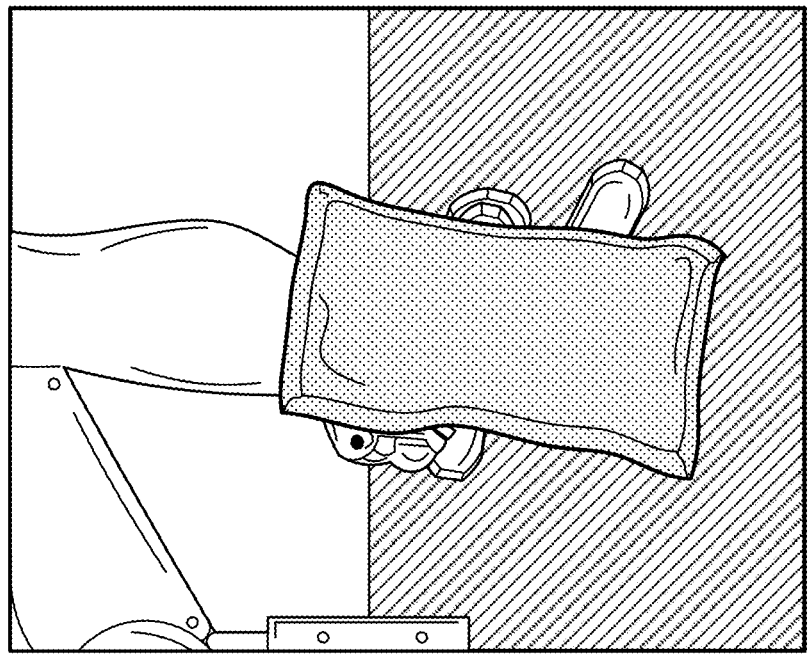

Two patterns (strong and weak) of the gripping force for the work object are taught as illustrated in FIG. 15A and FIG. 16A. A sponge which has relatively low rigidity among articles of daily use and tends to easily show the strength of the gripping force, whether strong or weak, as a deformation volume was used as the work object. Then, the work object is held with the taught gripping force of the two patterns (strong and weak) as illustrated in FIG. 15B and FIG. 16B. As a result of checking the teaching of the gripping force and how the gripped part has deformed in a replication motion, a different volume of deformation was observed depending on the taught gripping force.

Figure 17:
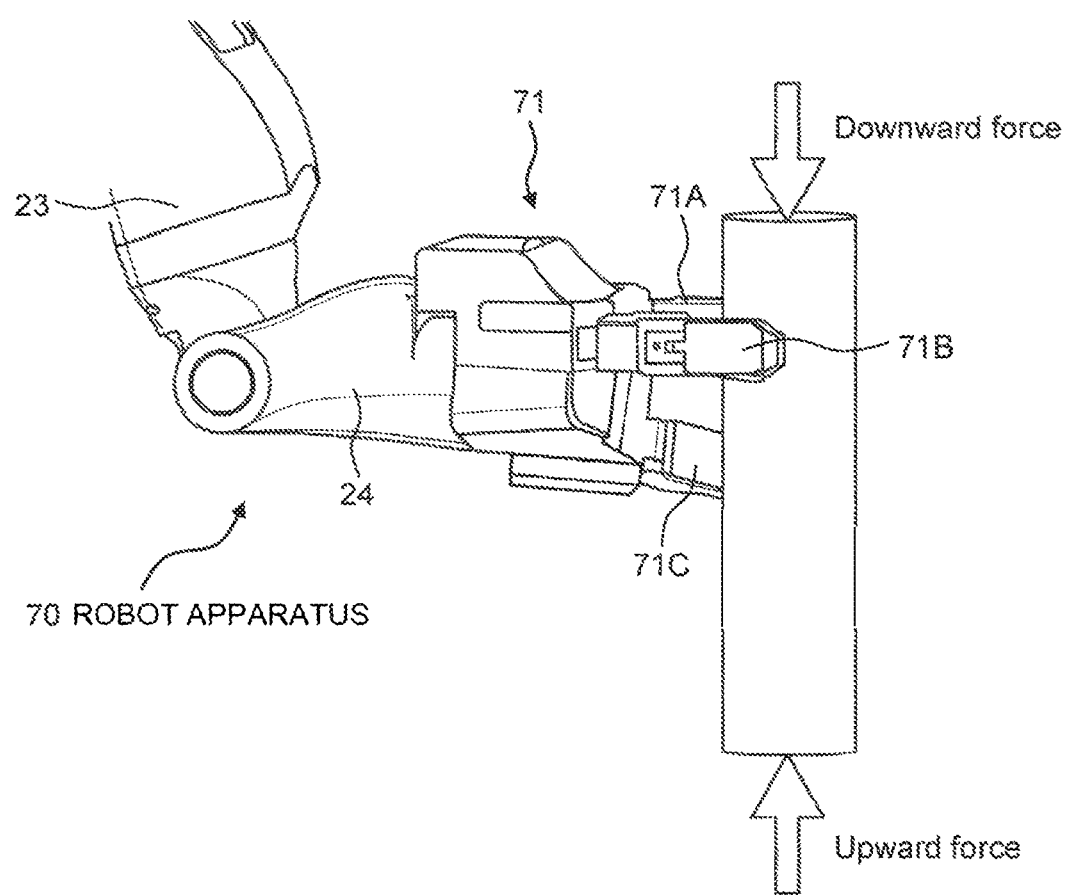
FIG. 17 is a diagram for explaining measurement of a load centroid movement amount.
Figure 18A:
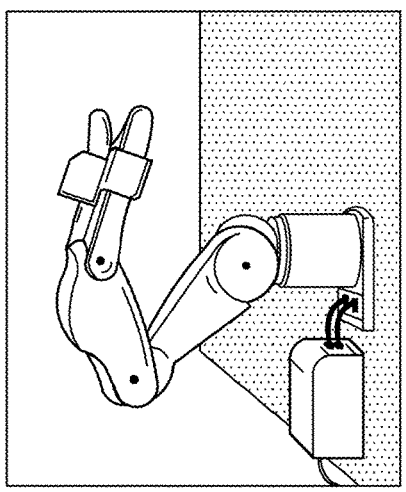
FIG. 18 is a continuity chart illustrating a motion process of an articulated arm and the end effector.
Figure 18B:
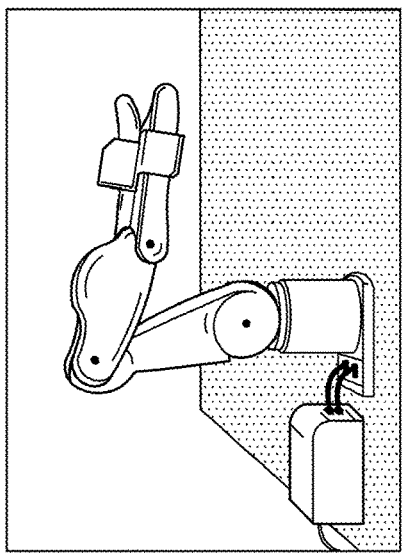
Figure 18C:
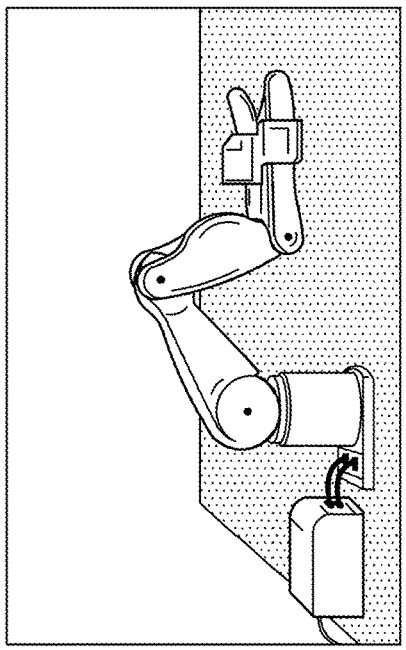
Figure 18D:
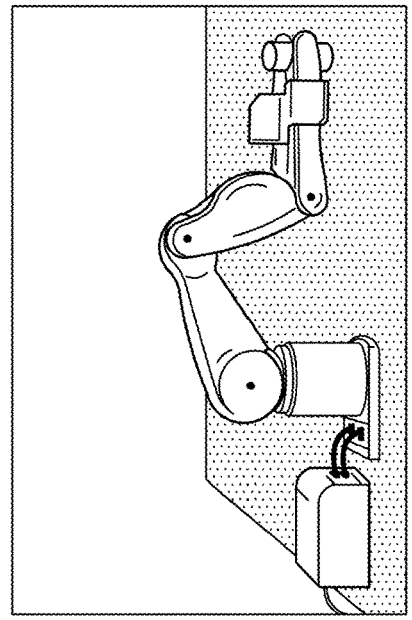
Figure 18E:
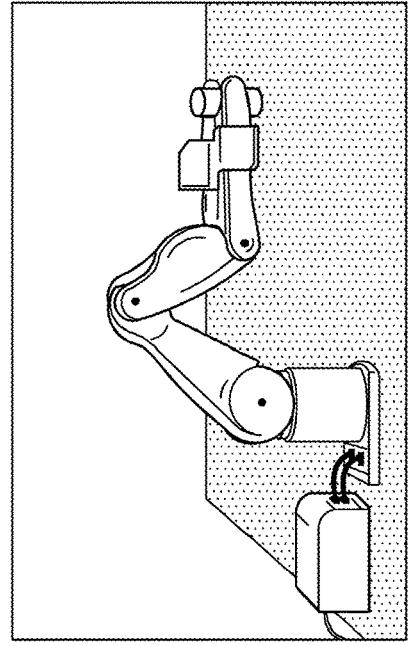

Subsequently, as illustrated in FIG. 17, when an external force is applied to a top face and a bottom face of the held cylinder, a y-direction movement amount of the load centroid measured by each force sensor 71A to 71C incorporated into the end effector 71 is measured in order to check the possibility to detect movements of the load centroid the load centroid. Firstly, a downward force is applied for 8 seconds and then an upward force is applied for 8 seconds. The evaluation is performed by averaging the load centroid while applying each of the downward force and the upward force.

FIG. 18A to FIG. 18E illustrate a motion process of the articulated arm 21 to 24 and the end effector 71 of the robot apparatus 70. It was confirmed by means of trajectory control based on the inverse kinematics that the articulated arm 21 to 24 and the end effector 71 of the robot apparatus 70 were capable of approaching to, and holding, the object while maintaining the designated posture.

As a result of the measuring accuracy evaluation experiment, FIG. 19A and FIG. 19B show the relation of a value obtained by subtracting an added load from the load measured by each force sensor 72A to 72C incorporated into the end effector 71. A circle dot represents an error sample mean and a vertical bar represents a standard deviation of the error. FIG. 19A shows a measurement error including the non-uniform load; and FIG. 19B shows the result of the measurement error of the uniform load. It was confirmed from the experiment results that the developed force sensor 72A to 72C has the measurement accuracy with the error sample mean of −0.052 [N] and the standard deviation of 0.088 [N]. Also, regarding the uniform load, the error sample mean was −0.004 [N] and the standard deviation was 0.076 [N].

Figure 20:
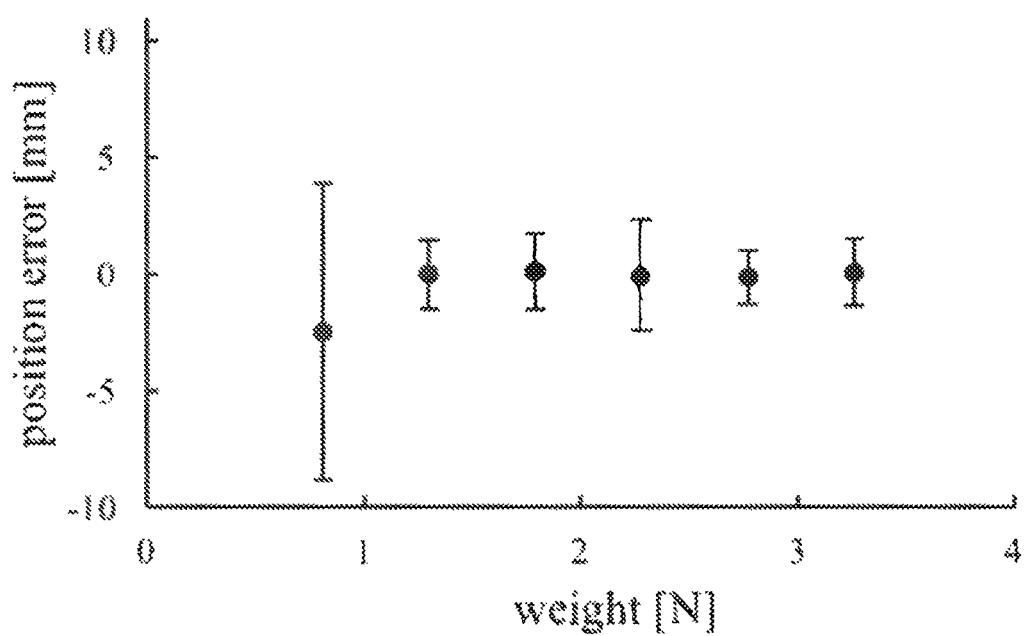
FIG. 20 is a graph indicating the results of a uniform load measuring accuracy evaluation experiment.

FIG. 20 shows the results of the measuring accuracy of the load centroid. According to the experiment results, regarding the load of 0.81 [N], the error sample mean was −2.47 [mm] and the standard deviation was 6.38 [mm]; regarding the load of 1.30 [N], the error sample mean was −0.03 [mm] and the standard deviation was 1.48 [mm]; regarding the load of 1.79 [N], the error sample mean was 0.12 [mm] and the standard deviation was 1.63 [mm]; regarding the load of 2.28 [N], the error sample mean was −0.05 [mm] and the standard deviation was 2.37 [mm]; regarding the load of 3.77 [N], the error sample mean was −0.14 [mm] and the standard deviation was 1.14 [mm]; and regarding the load of 3.26 [N], the error sample mean was −0.0 [mm] and the standard deviation was 1.6 [mm].

Figure 21:
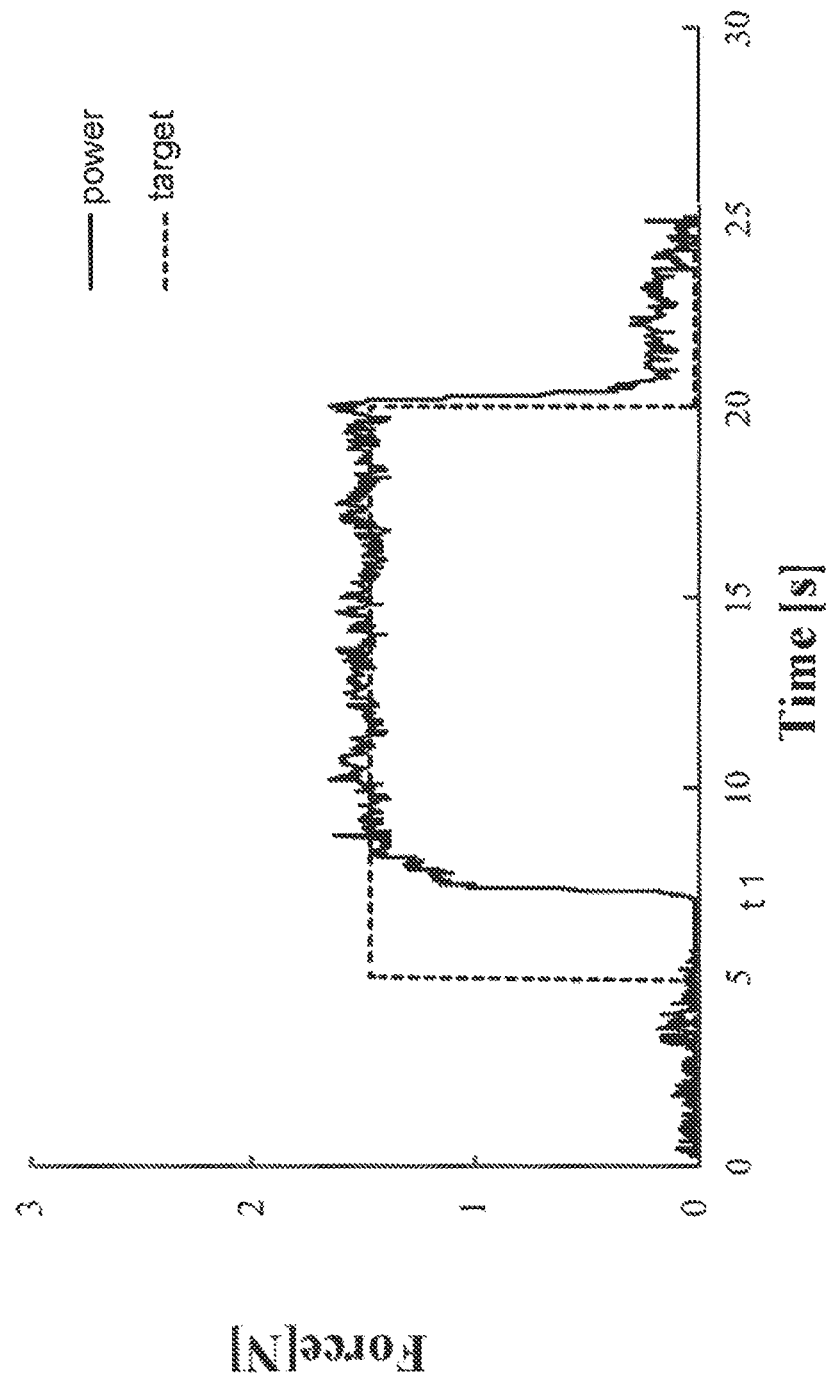
FIG. 21 is a graph indicating the results of load centroid measuring accuracy.

FIG. 21 shows the gripping force value measured by each force sensor 72A to 72C incorporated into the end effector 71. The closing motion of the finger parts 71A to 71C of the end effector 71 was started at a point after the elapse of 5 [s]. At certain time t1, the end effector 71 entered contact with the work object and the gripping force increased. At that time, the target gripping force was followed; and at a point after the elapse of 20 [s], the opening motion of the finger parts started and also the gripping force decreased. At that point, regarding the gripping force value from 15 [s] to 20 [s] with respect to the target gripping force 1.47 [N], the average was 1.489 [N], the error sample mean was 0.019 [N], and the standard deviation was 0.050 [N]. The accuracy of the gripping force control for the entire system, together with the measuring accuracy by the force sensor 72A to 72C resulted in the error sample mean of 0.033 [N] and the standard deviation of 0.138 [N].

Figure 22:
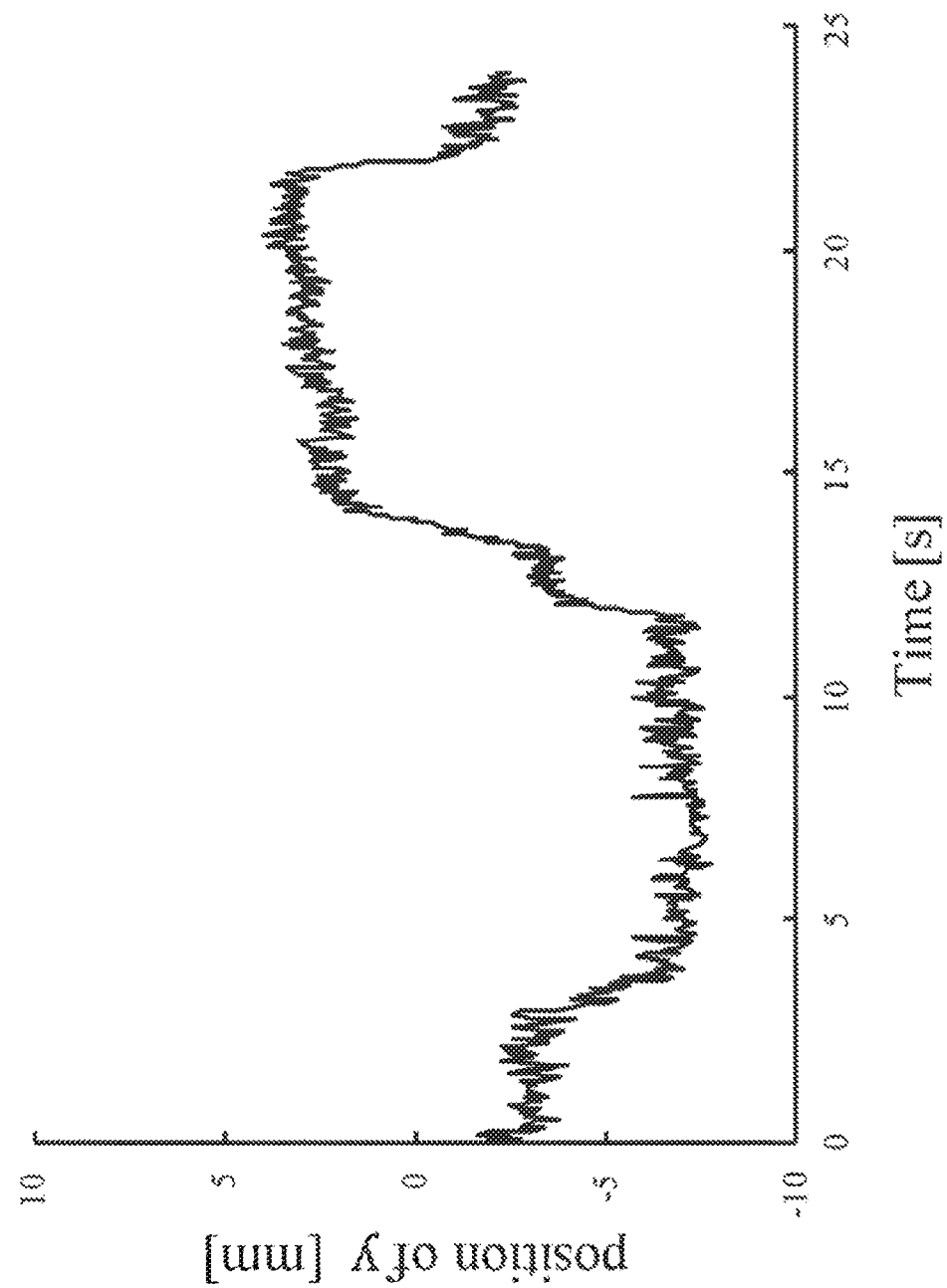
FIG. 22 is a graph indicating a gripping force value measured by the force sensor.

FIG. 22 shows a y-direction position of the load centroid during the test. An average of the y position before applying the forces was −3.1 [mm]. Also, an average of the y-direction position when applying the downward force was −7.0 [mm]; and an average of the y-direction position when applying the upward force was 2.6 [mm].

Accordingly, since the robot apparatus 70 was capable of approaching to, and holding the work object while maintaining the articulated arm 21 to 24 and the end effector 71 in the designated posture, it was confirmed that the control of the position and posture of the articulated arm 21 to 24 and the end effector 71 based on the inverse kinematics was successfully implemented. Consequently, this shows that the robot apparatus 70 which can be controlled at an arbitrary position and posture in the work environment is realized.

Furthermore, when holding the work object with the end effector 71, the robot apparatus 70 calculates the position of the load centroid to each force sensor 72A to 72C based on the friction coefficient of the surface of each finger part 71A to 71C and then detects the external force to the work object based on the movements of the load centroid, so that the robot apparatus 70 can maintain the gripping force by the end effector 71 within an appropriate range on the basis of the detection results even if the load applied to the fingertips of the respective finger parts 71A to 71C is non-uniform according to the position and posture of the articulated arm 21 to 24.

Incidentally, with the robot apparatus 70, the controller (the gripped object recognition unit) 60 may recognize the work object, which is the object to be held by the end effector 71, on the basis of the image capture results of an object close and adjacent to the end effector 71 by the imaging unit (either the imaging unit 30 or the imaging camera 32, or both of them).

Then, when the gripping motion by the end effector 71 to hold the work object is taught by the operator, the controller 60 generates teaching-related data by associating the detection results of the force sensors 72A to 72C corresponding to the pressing force of the respective finger parts 71A to 71C of the end effector 71 with the gripped object recognition result and stores the teaching-related data in the storage unit 63, and then reads the teaching-related data corresponding to a work object, which is the same as or approximate to the work object whose image has been captured by the imaging unit, from the storage unit 63, and controls the gripping force of the end effector 71 based on the read teaching-related data.

Accordingly, the robot apparatus 70 can cause the end effector 71 to perform the gripping motion with an appropriate gripping force in accordance with the work object and learn the gripping force adjustment skill as taught by the operator. As a result, it also becomes possible to handle work objects with different rigidity, which exist in life scenes, with an appropriate gripping force.

(6) Other Embodiments

This embodiment has described the case where the robot apparatus 11 (70) as the upper limb motion support apparatus is applied as a vertical-articulated-type robot arm with the 6 degrees of freedom; however, the present invention is not limited to this example and can be applied to a wide variety of robot apparatuses having various structures as a third hand for not only a hemiplegic person, but also a healthy person as long as it can be made to perform the cooperative motion in coordination with the operator's upper limb motion.

Furthermore, this embodiment has described the case where the end effector which is configured to have the gripping function with the three ringers as illustrated in FIG. 1 (FIG. 6) is applied as the end effector 25 (71) attached to the wrist part 24 (its free end) side of the articulated arm 21 to 24 of the robot apparatus 11 (70); however, the present invention is not limited to this example and a plurality of types of the end effector 25 (71) may be prepared for each work content and the end effector 25 (71) may be attached, in a manner selectively according to the relevant the work content, to the free end side of the articulated arm 21 to 24 in a freely attachable/detachable manner. This end effector 25 (71) may be designed to have a simple jig configuration or may be configured to perform the opening motion or the closing motion by driving the actuator in conjunction with the motion of the articulated arm 21 to 24 under the control of the controller 60.

Furthermore, this embodiment has described the case where the free end side of the articulated arm 21 to 24 or the end effector 25 is equipped with the imaging camera 32 of the robot apparatus 11; however, the present invention is not limited to this example and the imaging camera 32 may be installed separately as a solo item at a location close to the robot apparatus 11 or may further be mounted on the operator's head by the operator by themselves by incorporating it into, for example, glasses.

Consequently, the controller 60 no longer needs to control the articulated arm 21 to 24 and the end effector 25 as appropriate so as to capture images of the operator's face and the extended end of the operator's line of sight alternately at desired switching timing and it becomes possible to continuously detect the line of sight by always capturing images of the operator's face.

Furthermore, the explanation has been provided about the case where the imaging unit 30 provided at the support 20 and the imaging camera 32 provided at at least either the articulated arm 21 to 24 or the end effector 25 (71) are applied as the imaging unit according to the present invention; however, the present invention is not limited to this example and a wide variety of imaging means can be applied such as either the imaging unit 30 or the imaging camera 32, or their combination, as long as such imaging means is capable of capturing images of the surrounding environment including the operator when it is used.

Furthermore, this embodiment has described the case where the controller 60 in the control unit 50 executes the action pattern classification unit, which classifies the upper limb motion of the operator regarding each work content as action patterns composed of a time series of a sequence of motions according to the work content, and the action-related data generation unit, which generates the action-related data obtained by chronologically connecting combinations of the surrounding environment and the recognized content of the operator's upper limb motion with respect to each of the action patterns, by describing the aforementioned StateMap using the storage unit 63 as the action database; however, the present invention is not limited to this example and various techniques can be applied as long as similar processing can be executed under the control of the controller 60.

Furthermore, in this embodiment, the robot apparatus 70 may further include a stimulus imparting unit (which is not shown in the drawing) which is attached to the operator's desired skin surface and imparts external stimuli to the skin surface; and when holding the work object by using the end effector 71, the controller 60 may cause the stimulus imparting unit to impart the external stimuli of the pattern and strength according to the gripping force by the end effector 71 to the operator on the basis of the detection results of the force sensors 72A to 72C corresponding to the respective finger parts 71A to 71C.

As a result, the operator can perceive the gripping force of the end effector 71 on a real-time basis and reflect it in their own upper limb motion. Furthermore, the operator can also feed back and adjust the gripping motion of the end effector 71 without teaching the gripping motion to the upper limb motion support apparatus.

Furthermore, this embodiment has described the case where the joint state detection circuit 65 is applied as the joint angle detection unit; however, the present invention is not limited to this example and an angle sensor may be incorporated with the actuator for each joint and the joint angle may be detected directly from the detection result of such each angle sensor. Furthermore, whether the end effector 71 is holding the work object in a tilted manner or not can be perceived by using an acceleration sensor (gyro sensor) to detect the position and posture of each joint.

REFERENCE SIGNS LIST

10: robot system
11, 70: robot apparatus
12: communication line
13: data terminal equipment
14: administrative server
20: support
21: shoulder part
22: lower arm part
23: upper arm part
24: wrist part
25, 71: end effector
30: imaging unit
31: sound concentrating microphone
32: imaging camera
50: control unit
60: controller
61: biological signal detection unit
62: drive circuit
63: storage unit
64: communication unit
65: joint state detection circuit
66: battery
71A to 71C: finger parts
72A to 72C: force sensors
MA to MG: actuators
RA to RG: rotary encoders

The invention claimed is:

1. An upper limb motion support apparatus mounted on a table for supporting upper limb motion of an operator, the upper limb motion support apparatus comprising:
a support that is secured and retained on the table in a freely attachable and detachable manner and supports a main body of the apparatus;
an articulated arm having multiple degrees of freedom, wherein a fixed end side of the articulated arm is coupled to the support and a free end side of the articulated arm is coupled to an end effector;
an imaging unit that is provided at least one of the support, the articulated arm, and the end effector and captures images of a surrounding environment including the operator when it is used;
an upper limb motion recognition unit that recognizes the upper limb motion of the operator included in the surrounding environment whose images are captured by the imaging unit;
a biological signal detection unit that detects electric potential as a biological signal generated in association with the upper limb motion of the operator;
a controller that causes the articulated arm and the end effector to perform three-dimensional motion according to an intention of the operator on the basis of the biological signal acquired by the biological signal detection unit; and
a sight line detection unit that executes processing for recognizing a face image of the operator which is captured by the imaging unit and detects a line of sight of the operator,
wherein the controller causes the articulated arm and the end effector to perform the cooperative motion in conjunction with the upper limb motion of the operator while appropriately controlling the articulated arm and the end effector so that the imagining unit captures images of the operator's face and an extended end of the operator's line of sight alternately at desired switching timing, and
wherein the controller causes the articulated arm and the end effector to perform cooperative motion in conjunction with the upper limb motion of the operator while referring to content recognized by the upper limb motion recognition unit.

2. The upper limb motion support apparatus according to claim 1, comprising:
an action pattern classification unit that classifies the upper limb motion of the operator regarding each work content as action patterns composed of a time series of a sequence of motions according to the work content; and
an action-related data generation unit that generates action-related data obtained by chronologically connecting combinations of the surrounding environment, whose images are captured by the imaging unit, and the recognized content of the upper limb motion of the operator by the upper limb motion recognition unit with respect to each of the action patterns classified by the action pattern classification unit,
wherein the controller controls and adjusts the articulated arm and the end effector while estimating the motion intention of the operator based on the action-related data obtained from the action-related data generation unit.

3. The upper limb motion support apparatus according to claim 2, further comprising:
an action pattern classification unit that classifies the upper limb motion of the operator regarding each work content as action patterns composed of a time series of a sequence of motions according to the work content; and
an action-related data generation unit that generates action-related data obtained by chronologically connecting combinations of the surrounding environment, whose images are captured by the imaging unit, the recognized content of the upper limb motion of the operator by the upper limb motion recognition unit, and a movement history of the operator's line of sight by the sight line detection unit with respect to each of the action patterns classified by the action pattern classification unit,
wherein the controller controls and adjusts the articulated arm and the end effector while estimating the motion intention of the operator based on the action-related data obtained from the action-related data generation unit.

4. An upper limb motion support system comprising:
the upper limb motion support apparatus of claim 2;
a communication unit that is provided in the upper limb motion support apparatus and transmits the action-related data obtained for each action pattern from the action-related data generation unit and control adjustment data indicating a control adjustment result of the articulated arm and the end effector corresponding to the action-related data; and data terminal equipment that is provided separately from the upper limb motion support apparatus, receives the action-related data and the control adjustment data via a communication line from the communication unit, forms the received data into a database, and stores the database in an administrative server.

5. The upper limb motion support system according to claim 4,
wherein regarding a data group of the action-related data and the control adjustment data stored in the administrative server, the data terminal equipment sequentially updates, with respect to each action pattern, the action-related data and the control adjustment data that represent an action pattern which is the same as or approximate to the relevant action pattern.

6. The upper limb motion support system according to claim 5,
wherein when the controller for the upper limb motion support apparatus transmits the action-related data and the control adjustment data representing an action pattern according to current work content to the data terminal equipment via the communication unit,
the data terminal equipment reads the action-related data and the control adjustment data representing an action pattern which is the same as or approximate to the action pattern according to the relevant work content, from the data group of the action-related data and the control adjustment data stored in the administrative server and transmits the read data via the communication unit of the upper limb motion support apparatus to the controller.

7. The upper limb motion support apparatus according claim 1, comprising:
a sound collection unit that collects sound of the surrounding environment of the operator; and
a language analysis unit that analyzes utterance content of the operator whose sound is collected by the sound collection unit,
wherein the controller controls and adjusts the articulated arm and the end effector with motion content according to the utterance content on the basis of the utterance content of the operator analyzed by the language analysis unit.

8. The upper limb motion support apparatus according to claim 7, further comprising:
an action pattern classification unit that classifies the upper limb motion of the operator regarding each work content as action patterns composed of a time series of a sequence of motions according to the work content; and
an action-related data generation unit that generates action-related data obtained by chronologically connecting combinations of the surrounding environment, whose images are captured by the imaging unit, the recognized content of the upper limb motion of the operator by the upper limb motion recognition unit, and the utterance content of the operator by the language analysis unit with respect to each of the action patterns classified by the action pattern classification unit,
wherein the controller controls and adjusts the articulated arm and the end effector while estimating the motion intention of the operator based on the action-related data obtained from the action-related data generation unit.

9. The upper limb motion support apparatus according to claim 8,
wherein the action-related data generation unit generates the action-related data by chronologically connecting a movement history of the operator's line of sight by the sight line detection unit in addition to the combinations.

10. The upper limb motion support apparatus according to claim 1,
wherein the end effector includes at least two or more finger parts capable of moving fingertips in directions closer to or away from each other and a force sensor which is provided on each fingertip of each of the finger parts and detects a pressing force applied to a work object in contact with the fingertip;
wherein the articulated arm includes a joint angle detection unit which detects a joint angle of each joint securing the multiple degrees of freedom; and
wherein when holding the work object by using the end effector, the controller controls a gripping force by the end effector to achieve a desired target gripping force on the basis of a detection result of the force sensor corresponding to each finger part and a detection result of the joint angle detection unit corresponding to each joint and maintains the gripping force by the end effector within an appropriate range even if a load applied to the fingertip of each finger part is non-uniform depending on a position and posture of the articulated arm.

11. The upper limb motion support apparatus according to claim 10,
wherein when holding the work object by using the end effector, the controller calculates a position of a load centroid relative to each force sensor on the basis of a surface friction coefficient of each finger part and then detects an external force on the work object on the basis of a movement of the load centroid.

12. An upper limb motion support system comprising:
the upper limb motion support apparatus stated in claim 11;
a communication unit that is provided in the upper limb motion support apparatus and transmits the teaching-related data obtained from the teaching-related data generation unit; and
data terminal equipment that is provided separately from the upper limb motion support apparatus, receives the teaching-related data transmitted from the communication unit via a communication line, forms the received data into a database, and stores the database in an administrative server.

13. The upper limb motion support system according to claim 12,
wherein regarding the teaching-related data stored in the administrative server, the data terminal equipment stores the teaching-related data in the administrative server which sequentially updates, with respect to each work object, the teaching-related data that represent a work object which is the same as or approximate to the relevant work object.

14. The upper limb motion support system according to claim 13,
wherein when the controller for the upper limb motion support apparatus transmits the teaching-related data representing the work object, which becomes a currently gripped object held by the end effector, to the data terminal equipment via the communication unit, the data terminal equipment reads the teaching-related data representing a work object which is the same as or approximate to the relevant work object, from the teaching-related data stored in the administrative server and transmits the read data via the communication unit of the upper limb motion support apparatus to the controller.

15. The upper limb motion support apparatus according to claim 10, comprising:

a gripped object recognition unit that recognizes the work object, which is an object to be gripped by the end effector, from an image capture result of an object close and adjacent to the end effector by the imaging unit; and a teaching-related data generation unit that generates teaching-related data, when a gripping motion by the end effector to hold the work object is taught by the operator, by associating a detection result of the force sensor corresponding to a pressing force of each finger part of the end effector with a recognition result by the gripped object recognition unit, wherein the controller reads the teaching-related data corresponding to a work object, which is the same as or approximate to the work object whose images are captured by the imaging unit, from the teaching-related data generation unit and controls the gripping force of the end effector on the basis of the read teaching-related data.

16. The upper limb motion support apparatus according to claim 15, comprising:

an action pattern classification unit that classifies the upper limb motion of the operator regarding each work content as action patterns composed of a time series of a sequence of motions according to the work content; and an action-related data generation unit that generates action-related data obtained by chronologically connecting combinations of the surrounding environment, whose images are captured by the imaging unit, the recognized content of the upper limb motion of the operator by the upper limb motion recognition unit, and the teaching-related data generated by the teaching-related data generation unit with respect to each of the action patterns classified by the action pattern classification unit, wherein the controller controls and adjusts the articulated arm and the end effector while estimating the motion intention of the operator based on the action-related data obtained from the action-related data generation unit.

17. The upper limb motion support apparatus according to claim 1, further comprising a stimulus imparting unit that is attached to a desired skin surface of the operator and imparts an external stimulus to the skin surface, wherein when holding the work object by using the end effector, the controller causes the stimulus imparting unit to impart the external stimulus of a pattern and strength according to a gripping force by the end effector to the operator on the basis of the detection result of the force sensor corresponding to each finger part.

18. The upper limb motion support apparatus according to claim 1, wherein a plurality of types of the end effector are prepared for each work content and the end effector can be attached in a freely attachable and detachable manner to the free end side of the articulated arm selectively according to the work content.

* * * * *